US012265659B2

(12) United States Patent
Agarwal et al.

(10) Patent No.: US 12,265,659 B2
(45) Date of Patent: Apr. 1, 2025

(54) SYSTEMS AND METHODS FOR CREATING SOFT DEFORMABLE HIGH-DENSITY HAPTIC BUBBLE DISPLAYS

(71) Applicant: Meta Platforms Technologies, LLC, Menlo Park, CA (US)

(72) Inventors: Priyanshu Agarwal, Kirkland, WA (US); Joseph Andrew Aase, Seattle, WA (US); Erik Samuel Roby, Seattle, WA (US); Nicholas Colonnese, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 285 days.

(21) Appl. No.: 17/825,896

(22) Filed: May 26, 2022

(65) Prior Publication Data

US 2023/0075461 A1    Mar. 9, 2023

Related U.S. Application Data

(60) Provisional application No. 63/241,923, filed on Sep. 8, 2021.

(51) Int. Cl.
| | |
|---|---|
| *B29C 64/40* | (2017.01) |
| *B29C 33/38* | (2006.01) |
| *B33Y 10/00* | (2015.01) |
| *B33Y 40/20* | (2020.01) |
| *B33Y 80/00* | (2015.01) |
| *G06F 3/01* | (2006.01) |
| *B29K 91/00* | (2006.01) |

(52) U.S. Cl.
CPC .......... *G06F 3/016* (2013.01); *B29C 33/3842* (2013.01); *B29C 64/40* (2017.08); *B33Y 10/00* (2014.12); *B33Y 40/20* (2020.01); *B33Y 80/00* (2014.12); *B29K 2091/00* (2013.01)

(58) Field of Classification Search
None
See application file for complete search history.

(56) References Cited

U.S. PATENT DOCUMENTS

| | | | | |
|---|---|---|---|---|
| 5,631,861 | A * | 5/1997 | Kramer | G06F 3/016 703/7 |
| 10,725,541 | B1 * | 7/2020 | Desalvo | G02B 26/004 |
| 2018/0179051 | A1 * | 6/2018 | Keller | G06F 3/016 |
| 2022/0129075 | A1 * | 4/2022 | Kjos | G06F 3/014 |

\* cited by examiner

*Primary Examiner* — Mohammad M Ameen
(74) *Attorney, Agent, or Firm* — Greenberg Traurig, LLP

(57) ABSTRACT

The disclosed computer-implemented method may include creating a computer-generated model for a haptic feedback system including a plurality of actuators arranged in a first layer of the haptic feedback system, and a plurality of channels routed in a second layer of the haptic feedback system, the second layer being below the first layer, printing a three-dimensional wax mold structure of the computer-generated model, and forming the haptic feedback system in a single step using the three-dimensional wax mold structure. Various other methods, systems, and computer-readable media are also disclosed.

17 Claims, 17 Drawing Sheets

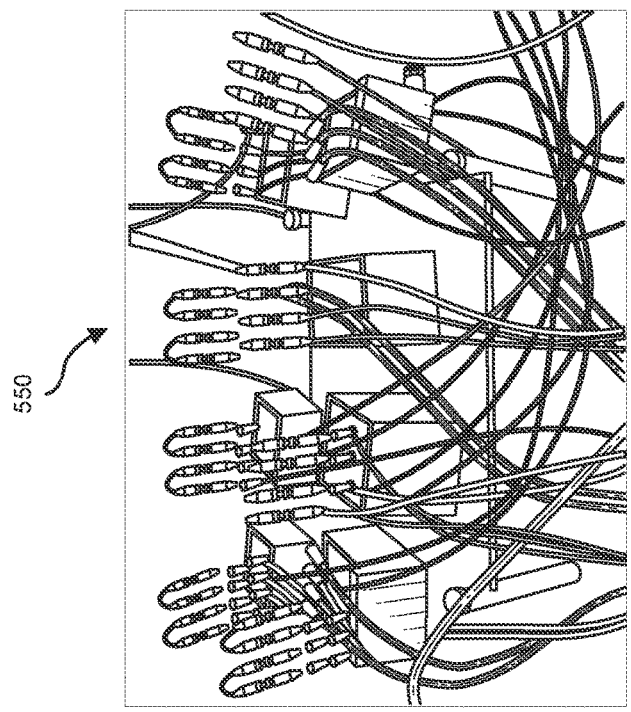
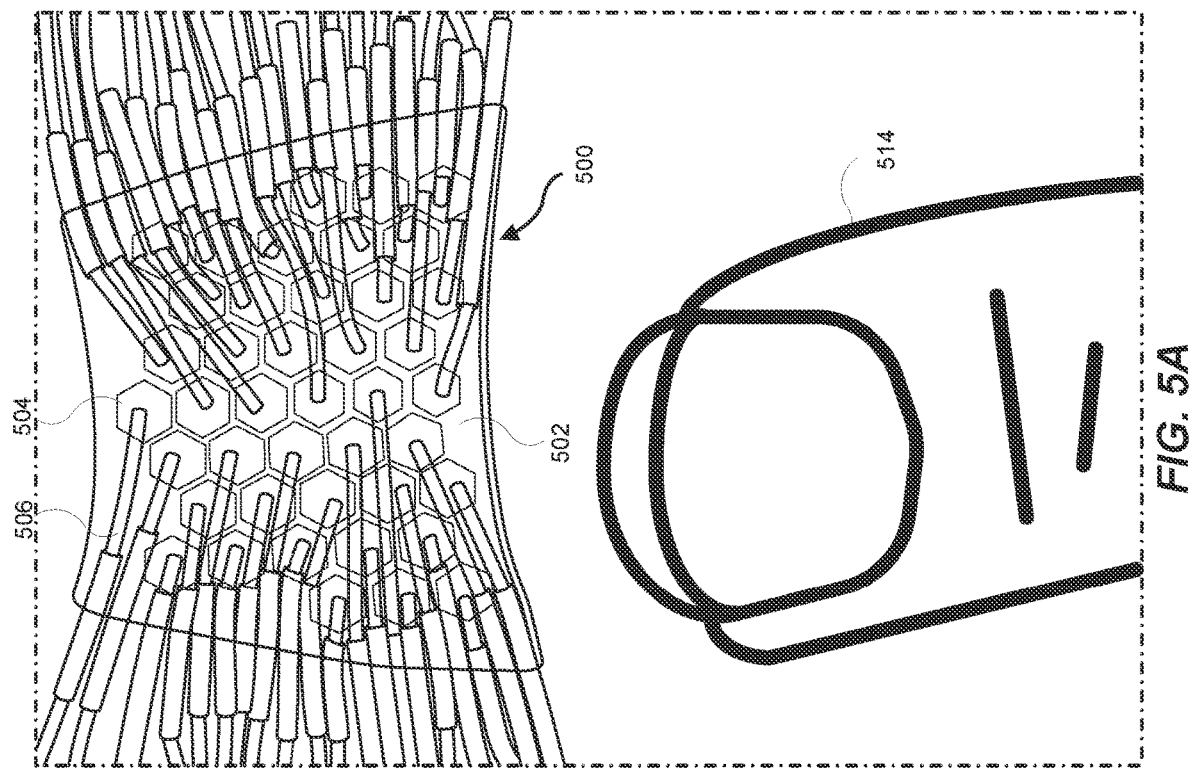
FIG. 5A
FIG. 5B

SYSTEMS AND METHODS FOR CREATING SOFT DEFORMABLE HIGH-DENSITY HAPTIC BUBBLE DISPLAYS

CROSS REFERENCE TO RELATED APPLICATION

This application claims the benefit of U.S. Provisional Application No. 63/241,923, filed on Sep. 8, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 5A is an illustration of a top view of an example soft deformable high-density haptic bubble display for use in a haptic feedback system that shows tubular connections to a pressure controller.

FIG. 5B is an illustration of an example pressure controller for use in a haptic feedback system that includes a soft deformable high-density haptic bubble display.

Figure 1:
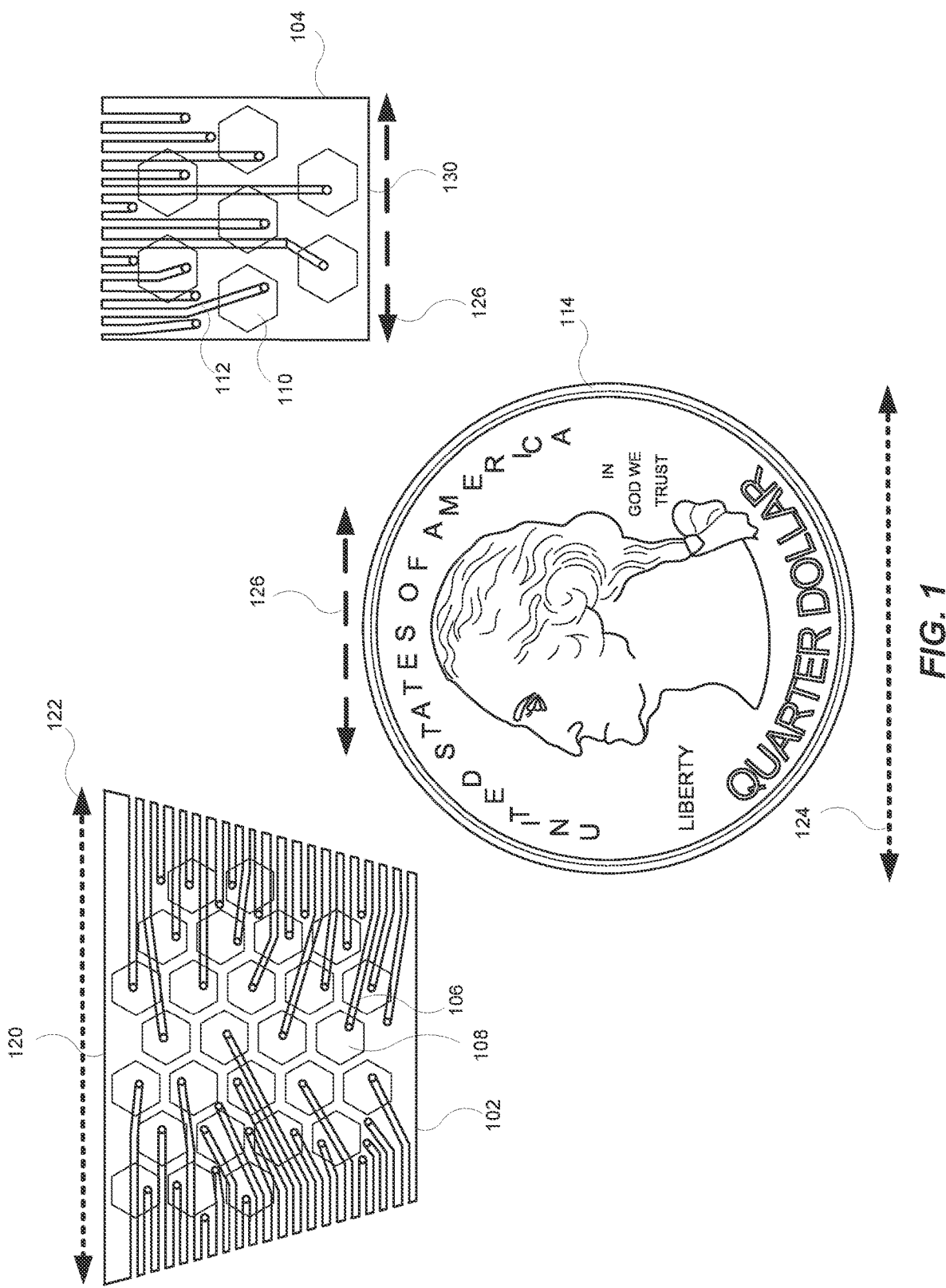
FIG. 1 is an illustration of example soft deformable high-density haptic bubble displays that may be incorporated into a haptic feedback system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Haptic devices may be incorporated in various systems to provide kinesthetic and tactile learning and/or feedback. Considered an important part of many artificial reality systems, haptic feedback may provide a realistic, high-fidelity experience to a user of the system. For example, an artificial reality system may include one or more haptic devices that may be handheld devices such as a joystick, wand, steering wheel, or other type of controller. In another example, an artificial reality system may include one or more wearable haptic devices, such as a glove, a headband, or a wristband.

In many applications, an important type of haptic feedback may be fine tactile pressure. In some implementations, a haptic feedback system may include fine tactile pressure as haptic feedback in order to provide a realistic, high-fidelity experience to a user of the haptic feedback system. The haptic feedback system may use the fine tactile feedback to recreate, for the user, a haptic sensation of object contact, edges, corners, gaps, and/or texture. In some implementations, providing haptic feedback for small, delicate, sensitive, and/or subtle characteristics of an object may be crucial for the precise manipulation of and/or interaction with virtual objects included in an artificial reality system such as a virtual reality (VR) system or an augmented reality (AR) system.

In some implementations, an artificial reality system may include a haptic feedback system that includes a soft deformable high-density set of actuators implemented as a bubble array, which is a type of fluidic elastomeric actuator that may also be referred to as an inflatable bladder. In some implementations, the bubble array may be a pneumatic bubble array. In some implementations, the soft deformable high-density set of actuators may be formed, created, or generated (e.g., manufactured) using a soft stretchable material with an optimum stiffness. Each actuator in the set of actuators may be individually actuated to render localized tactile pressure on a part of the human body (e.g., a hand, a finger, a wrist, a forehead, etc.). The density of the set of actuators may be determined so that the haptic feedback system renders sharp and continuous edges for objects that may be distinguishable from all tactile sensations perceived by a user of the artificial reality system during real object manipulation. Including a high-density set of actuators in a haptic feedback system may provide haptic feedback to a user that is close to a human perceptual resolution for the haptic feedback.

Figure 14:
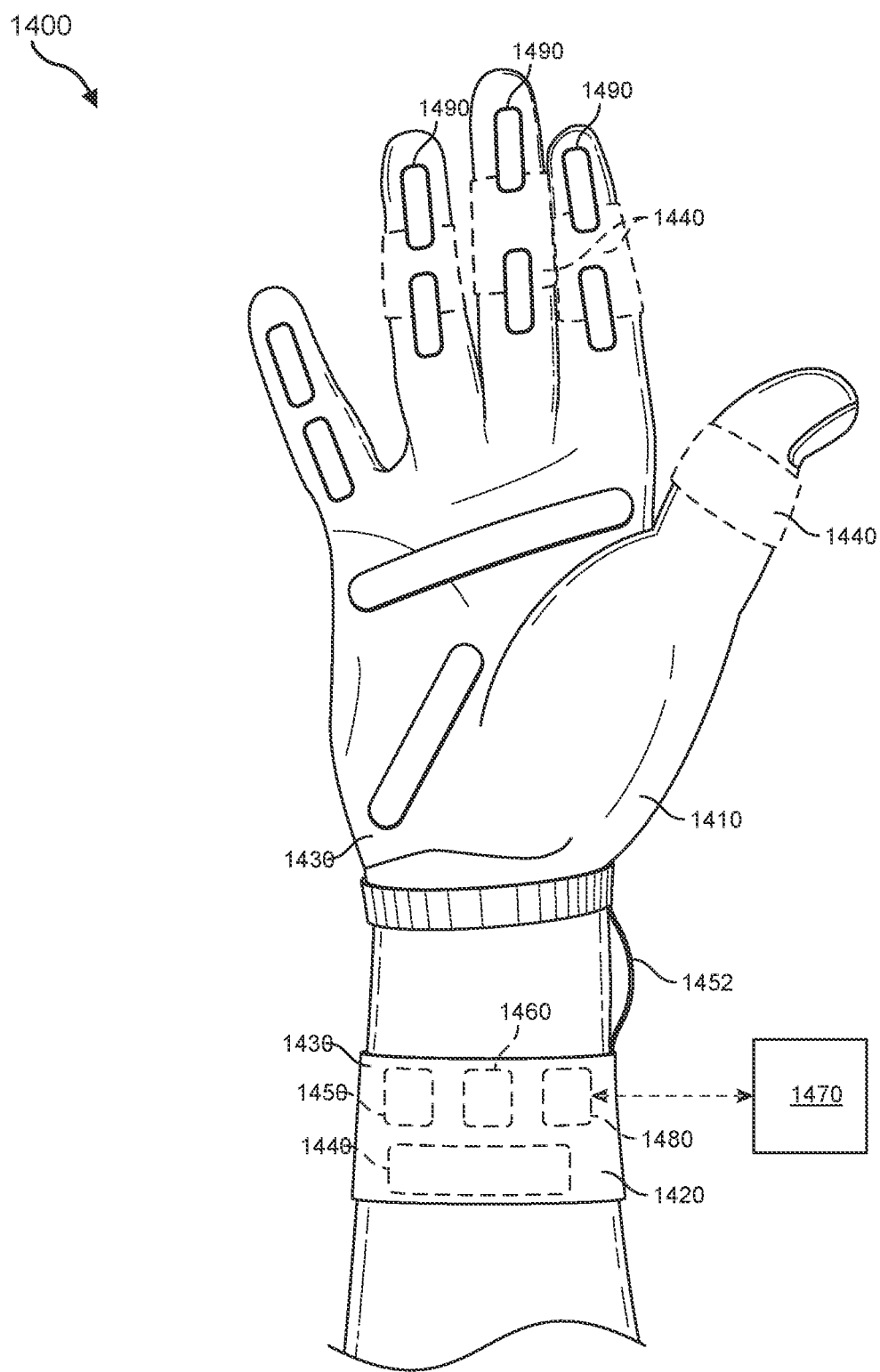
FIG. 14 is an illustration of exemplary haptic devices that may be used in connection with embodiments of this disclosure.
Figure 16:
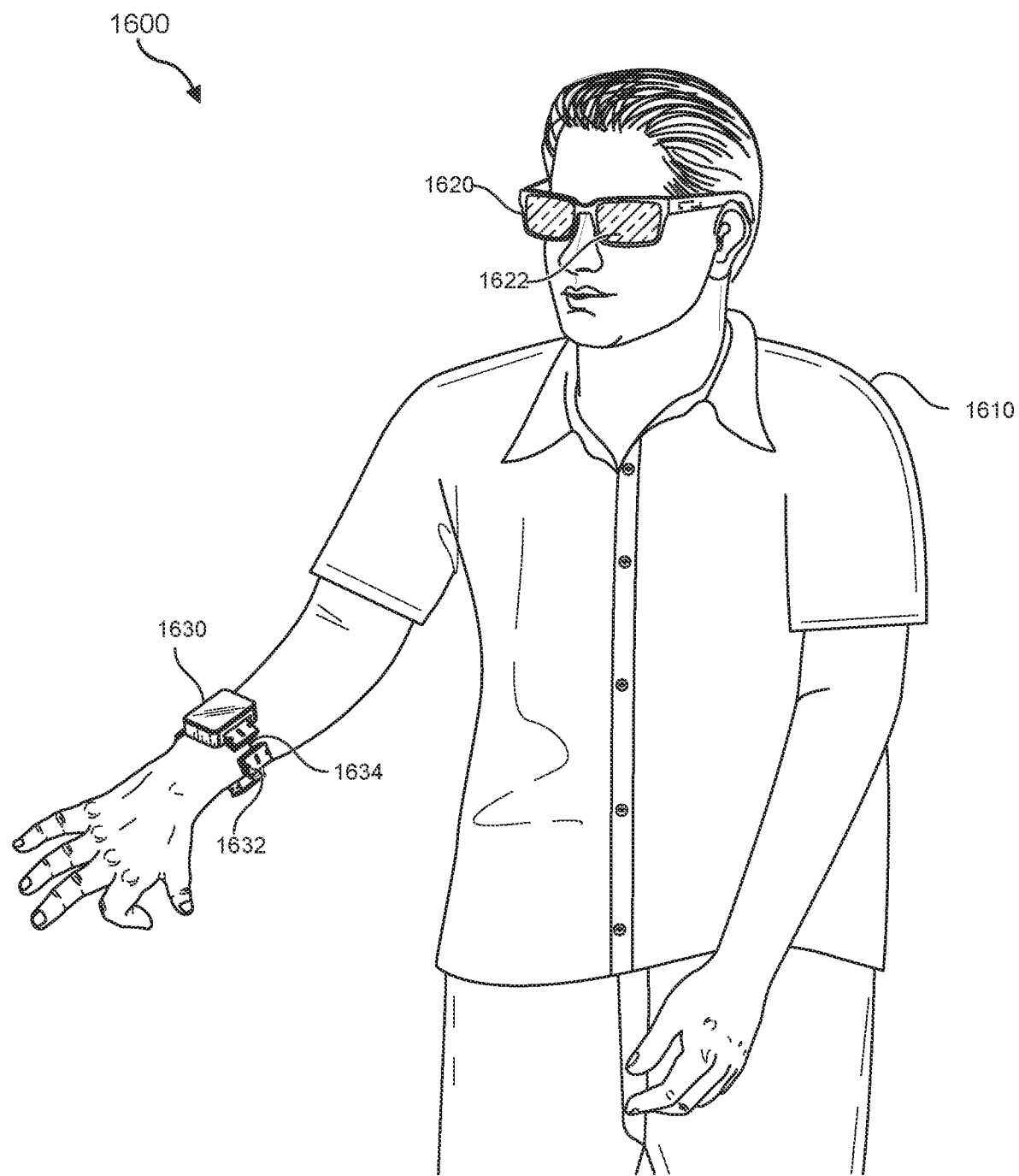
FIG. 16 is an illustration of an exemplary augmented-reality environment according to embodiments of this disclosure.

In addition, or in the alternative, the use of a soft deformable high-density set of actuators implemented as a bubble array in a haptic feedback system may allow the haptic feedback system to achieve actuation of an actuator at a relatively low pneumatic pressure for the actuator. The use of a lower pneumatic pressure for actuation of the actuator may allow the haptic feedback system to include a smaller pneumatic source. The smaller pneumatic source may contribute to a reduction in the size of the haptic feedback system. Forming, making, and/or manufacturing the soft deformable high-density set of actuators in a low encumbrance form-factor with deformable materials that may achieve actuation at a low pneumatic pressure may ensure that the set of actuators may be easily integrated into fully untethered wearables that may operate on a battery. A deformable material may be a soft stretchable material with an optimum stiffness. Examples of a fully untethered wearable may include, but are not limited to, a glove (e.g., haptic device 1410 as shown in FIG. 14), a headband, an armband or wristband (e.g., haptic device 1630 as shown in FIG. 16), a finger band or ring, a sleeve, a sock, a shirt, and pants.

In some implementations, a haptic feedback system (e.g., a pneumatic bubble array) may include multiple layers (e.g., multiple substrates) that may be separately fabricated and later assembled to form a single haptic feedback system. These haptic feedback systems may include actuators (e.g., bubbles) at a density of, for example, approximately six actuators per square centimeter ($cm^2$). For a haptic feedback system to adequately provide human perceptual resolution for haptic feedback, forming the haptic feedback system from the multiple separately fabricated layers may involve a precise alignment and bonding together of the layers. The precise alignment and bonding together of the layers when forming the haptic feedback system may be challenging and increasingly difficult to achieve as the size of the haptic feedback system decreases while the density of the actuators in the haptic feedback system increases. Reducing the overall size of the haptic feedback system while increasing the density of the actuators included in the haptic feedback system may result in a decrease in the size of each actuator to achieve the actuator density increase. In addition, or in the alternative, the bonding of the different layers after they are fabricated may lead to bonding failures, leakage, and other robustness issues for the haptic feedback system.

In some implementations, the bonding of the different layers after they are fabricated may involve each layer to be fabricated using compatible materials that may be bonded together after fabrication. This may impact the selection and use of optimal materials for forming the haptic feedback system. For example, limiting the material selections may result in the use of materials for a haptic feedback system that includes actuators that achieve actuation at a pneumatic pressure that is provided by a pneumatic source of a size that will not allow for the integration of the haptic feedback system into an untethered wearable as the haptic feedback system would be too large and/or would not operate on a battery (e.g., the haptic feedback system would require an amount of power that a battery may not adequately provide).

The present disclosure is generally directed to systems and methods for creating soft deformable high-density haptic bubble displays that may be integrated into haptic feedback systems. In some implementations, a haptic feedback system may be implemented as a pneumatic bubble array that includes multiple actuators. As will be explained in greater detail below, embodiments of the present disclosure may create a computer-generated model for a haptic feedback system. A three-dimensional wax mold structure of the model may be printed. The haptic feedback system may be formed in a single step using the three-dimensional wax mold structure. The haptic feedback system may include a first layer and a second layer with the second layer located below the first layer. The first layer may include multiple actuators (e.g., more than one actuator), and multiple channels may be routed in the second layer. Each of the multiple channels may interface with a respective actuator. The interfacing, coupling, or connecting of a channel to an actuator may allow for the actuation of the actuator using a fluid provided by a pressure controller by way of a tube connected or coupled to the channel.

The systems and methods for creating soft deformable high-density haptic bubble displays may include a single-shot molding technique for creating, generating, or forming (e.g., manufacturing) high-density bubble arrays of a thickness and actuator density that allows for the creation of extremely robust actuators in a variety of shapes and sizes. Including such high-density bubble arrays in a haptic feedback system may result in a haptic feedback system that adequately provides human perceptual resolution for haptic feedback, including the fine tactile feedback needed to recreate, for the user, a haptic sensation of object contact, edges, corners, gaps, and/or texture. These high-density bubble arrays allow for a haptic feedback system that may easily be integrated into an untethered wearable because the overall size of the haptic feedback system may be kept small based on the ability to actuate the actuators at a low pneumatic pressure. In addition, or in the alternative, the low pneumatic pressure needed to actuate the actuators may allow the haptic feedback system to operate on a battery.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 6:
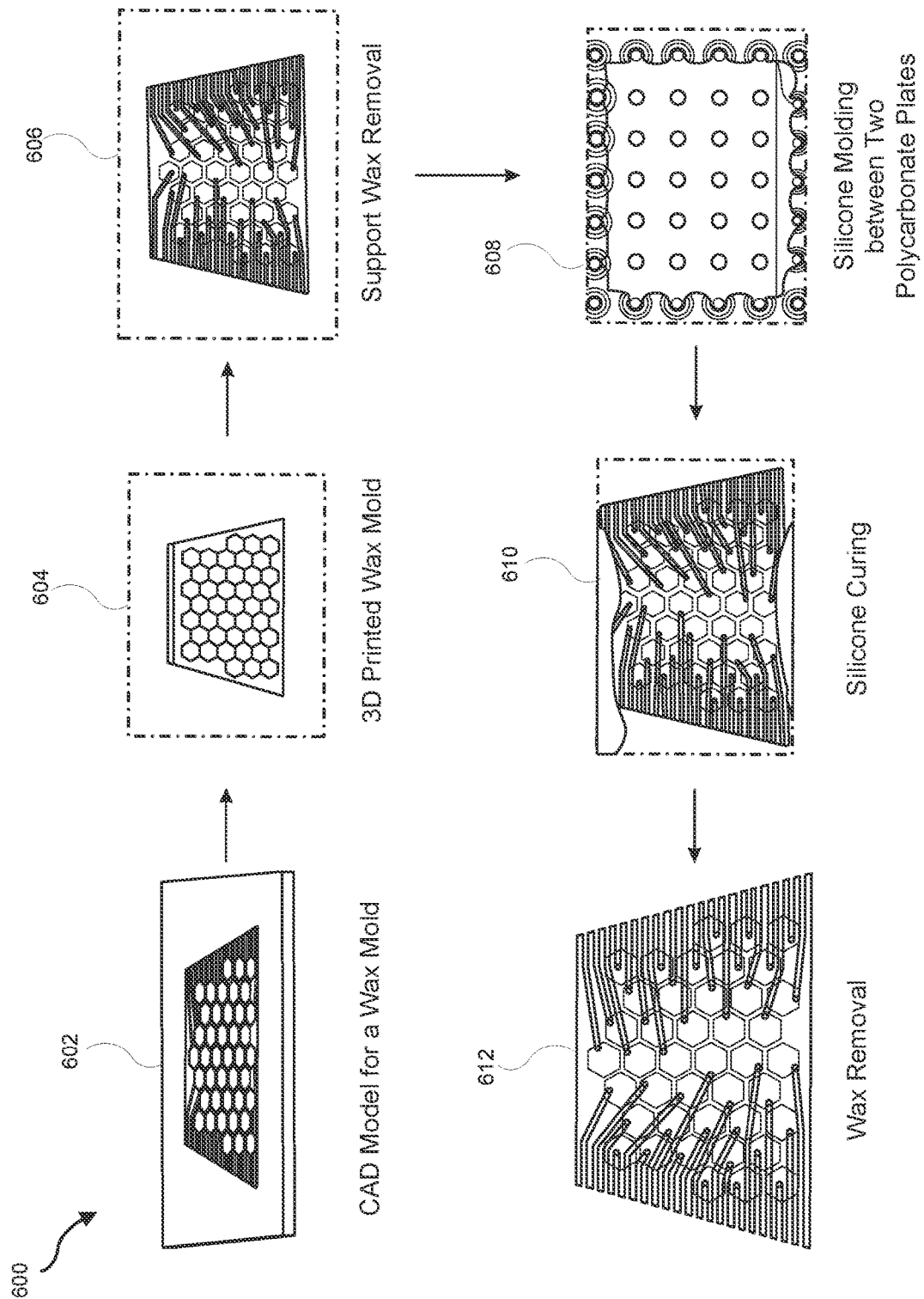
FIG. 6 is a block diagram of an example process for creating a soft deformable high-density haptic bubble display.
Figure 7A:
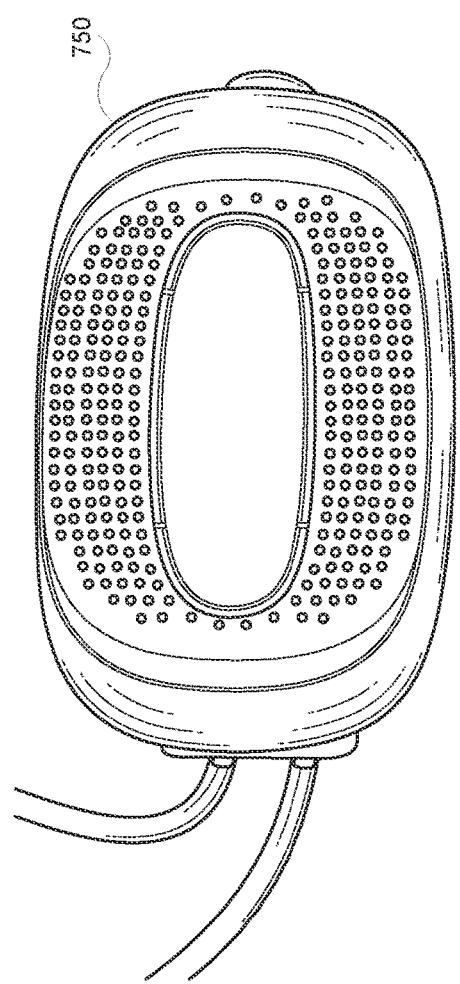
FIG. 7A is an illustration of an example pneumatic pump.
Figure 7B:
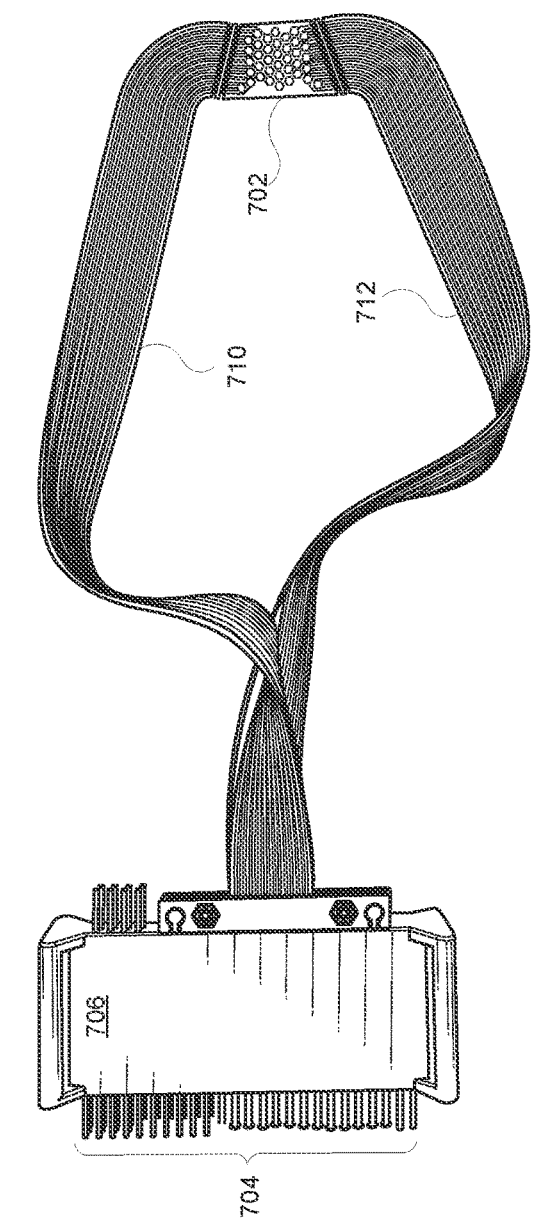
FIG. 7B is an illustration of a fluidic system that includes a haptic feedback system, pneumatic tubing, and a fluidic breakout.

The following will provide, with reference to FIGS. 1-5A-B, and 8A-B detailed descriptions of illustrations of example soft deformable high-density haptic bubble displays. FIG. 6 will provide an illustration of an example process for creating a soft deformable high-density haptic bubble display. FIGS. 7A-B will provide an illustration of an example experimental setup that includes an example soft deformable high-density haptic bubble display.

FIG. 1 is an illustration of example soft deformable high-density haptic bubble displays that may be incorporated into a haptic feedback system. FIG. 1 includes illustrations of a first haptic feedback system 102 and a second haptic feedback system 104. As a reference for size comparison, FIG. 1 includes an illustration of a coin 114 (e.g., a United States (US) quarter dollar). In general, a diameter of a US quarter dollar may be approximately 0.955 inches (e.g., approximately 24.26 millimeters). As shown in FIG. 1, a width 122 of the first haptic feedback system 102 at a wider end of the first haptic feedback system 102 (e.g., edge 120) may be approximately equal to a diameter 124 of the coin 114 (e.g., approximately equal to 24 millimeters). A width 126 of the second haptic feedback system 104 at an end of the second haptic feedback system 104 (e.g., edge 130) may be less than the diameter 124.

The first haptic feedback system 102 may include multiple actuators (e.g., a plurality of actuators). For example, actuator 108 may be an example of one of the actuators included in the first haptic feedback system 102. Each of the actuators included in the first haptic feedback system 102 may be of the same shape and size as shown in FIG. 1. The first haptic feedback system 102 may include multiple (a plurality of) channels (e.g., channel 106). Each channel may be routed to a respective actuator. For example, the channel 106 may be routed to the actuator 108. The actuators included in the first haptic feedback system 102 may be included in a first layer of the first haptic feedback system 102. The channels included in the first haptic feedback system 102 may be included in a second layer of the first haptic feedback system 102. The second layer may be located below the first layer.

The second haptic feedback system 104 may include multiple actuators. For example, actuator 110 may be an example of one of the actuators included in the second haptic feedback system 104. The actuator 110 is of a particular shape (e.g., a hexagon) and a particular size. Each of the actuators included in the second haptic feedback system 104 may be of the same shape and size as shown in FIG. 1. The second haptic feedback system 104 may include multiple channels (e.g., channel 112). Each channel may be routed to a respective actuator. For example, the channel 112 may be routed to the actuator 110. The actuators included in the second haptic feedback system 104 may be included in a first layer of the second haptic feedback system 104. The channels included in the second haptic feedback system 104 may be included in a second layer of the second haptic feedback system 104. The second layer may be located below the first layer.

Figure 2:
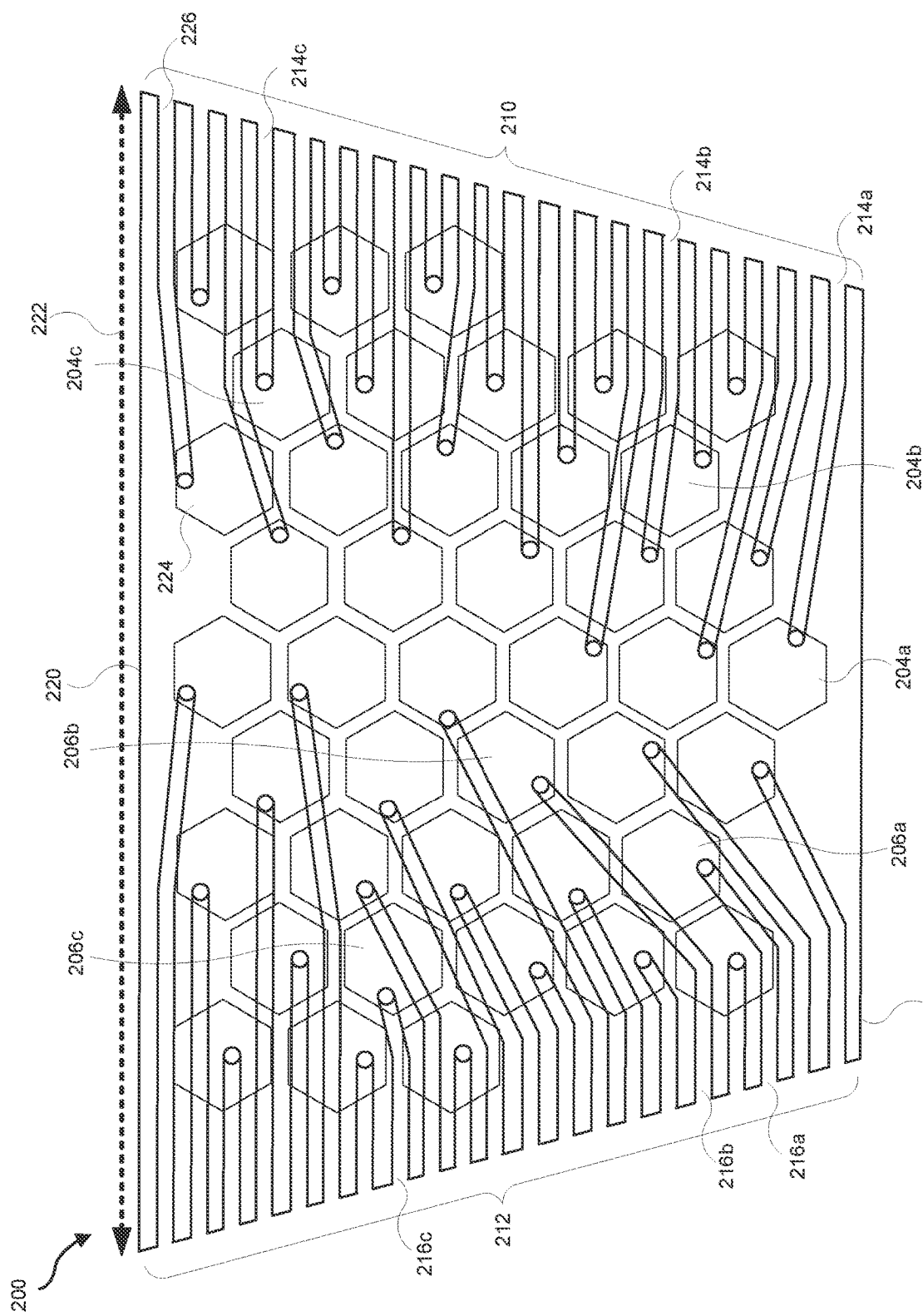
FIG. 2 is an illustration of a top view of an example soft deformable high-density haptic bubble display that includes hexagonal-shaped actuators with channels routed underneath the actuators.

FIG. 2 is an illustration of a top view 200 of an example soft deformable high-density haptic bubble display that includes hexagonal-shaped actuators with channels routed underneath the actuators. The example soft deformable high-density haptic bubble display may be a third haptic feedback system 202. The third haptic feedback system 202 may include multiple actuators. For example, actuator 224 may be an example of one of the actuators included in the third haptic feedback system 202. The actuator 224 is of a particular shape (e.g., a hexagon) and a particular size. In some implementations, referring to FIG. 1, a width 222 of the third haptic feedback system 202 at a wider end of the third haptic feedback system 202 (e.g., edge 220) may be approximately equal to the diameter 124 (e.g., approximately equal to 24 millimeters). In some implementations, the width 222 of the third haptic feedback system 202 at a wider end of the third haptic feedback system 202 (e.g., edge 220) may be less than the diameter 124.

Each of the actuators included in the third haptic feedback system 202 may be of the same shape and size as shown in FIG. 2. The third haptic feedback system 202 may include multiple channels (e.g., channel 226). Each channel may be routed to a respective actuator. For example, the channel 226 may be routed to actuator 224. The actuators included in the third haptic feedback system 202 may be included in a first layer of the third haptic feedback system 202. The channels included in the third haptic feedback system 202 may be included in a second layer of the third haptic feedback system 202. The second layer may be located below the first layer. The third haptic feedback system 202 may include the channels 210 and channels 212 (e.g., inlets, such as cantilever inlets) routed underneath or below multiple actuators (e.g., multiple bubble actuators such as, for example, actuator 224, actuators 204a-c, and actuators 206a-c).

Figure 3:
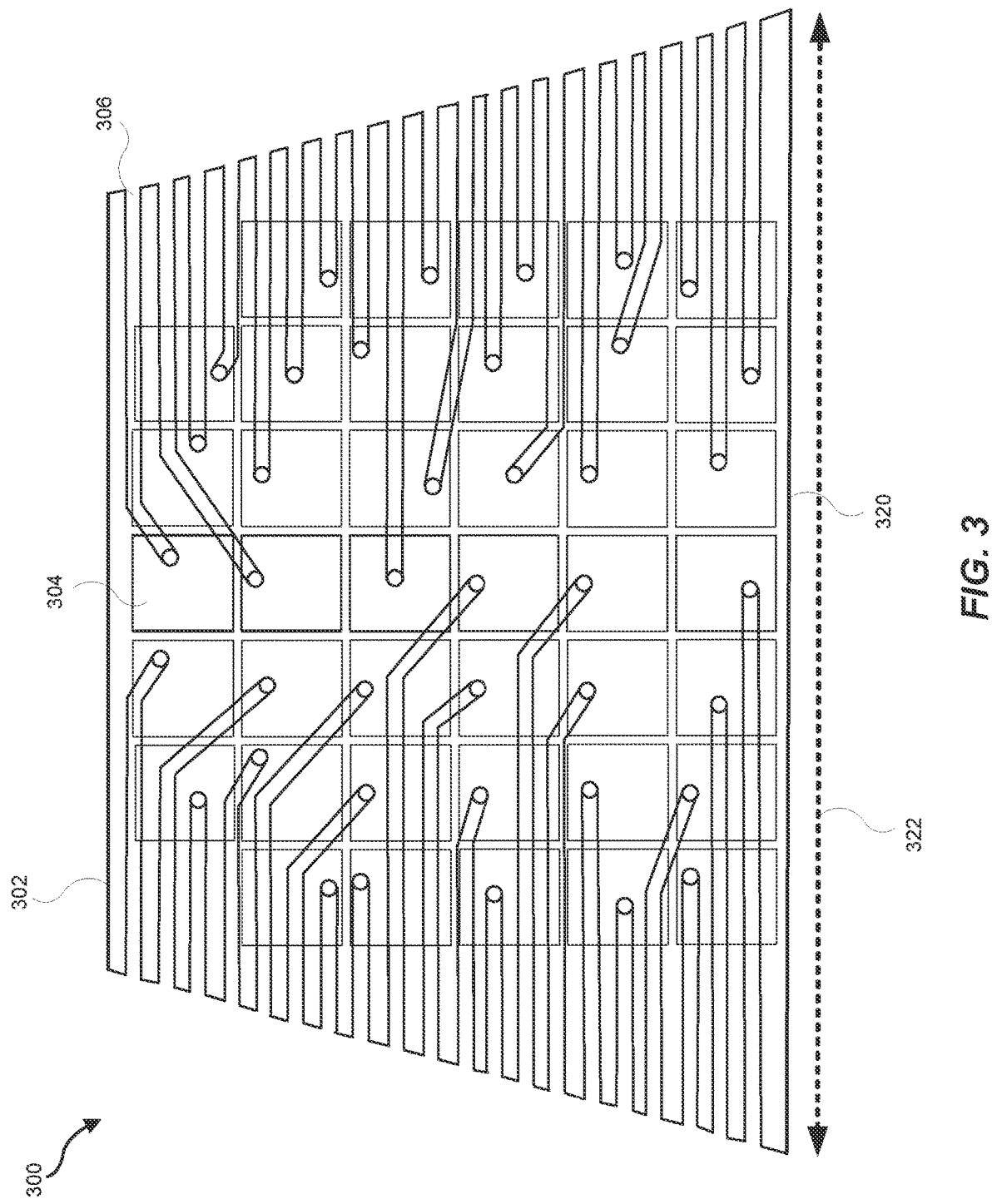
FIG. 3 is an illustration of a top view of an example soft deformable high-density haptic bubble display that includes rectangular-shaped actuators with channels routed underneath the actuators.

FIG. 3 is an illustration of a top view 300 of an example soft deformable high-density haptic bubble display that includes rectangular-shaped actuators with channels routed underneath the actuators. The example soft deformable high-density haptic bubble display may be a fourth haptic feedback system 302. The fourth haptic feedback system 302 may include multiple actuators. For example, actuator 304 may be an example of one of the actuators included in the fourth haptic feedback system 302. The actuator 304 is of a particular shape (e.g., a rectangle or a square) and a particular size. In some implementations, referring to FIG. 1, a width 322 of the fourth haptic feedback system 302 at a wider end of the fourth haptic feedback system 302 (e.g., edge 320) may be approximately equal to the diameter 124 (e.g., approximately equal to 26 millimeters). In some implementations, the width 322 of the fourth haptic feedback system 302 at a wider end of the fourth haptic feedback system 302 (e.g., edge 320) may be less than the diameter 124.

Each of the actuators included in the fourth haptic feedback system 302 may be of the same shape and size as shown in FIG. 3. The fourth haptic feedback system 302 may include multiple channels (e.g., channel 306). Each channel may be routed to a respective actuator. For example, the channel 306 may be routed to actuator 304. The actuators included in the fourth haptic feedback system 302 may be included in a first layer of the fourth haptic feedback system 302. The channels included in the fourth haptic feedback system 302 may be included in a second layer of the fourth haptic feedback system 302. The second layer may be located below the first layer.

Figure 4:
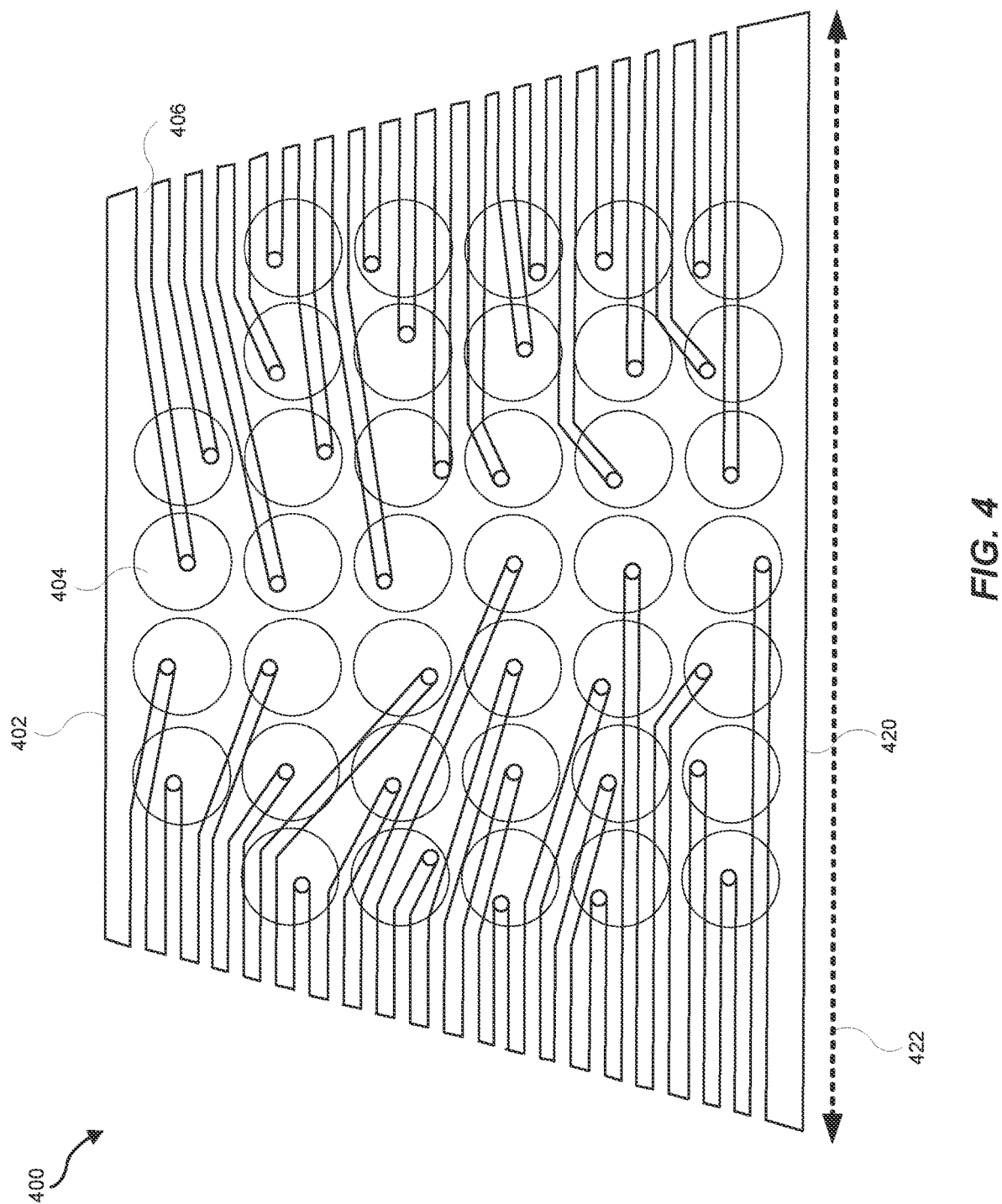
FIG. 4 is an illustration of a top view of an example soft deformable high-density haptic bubble display that includes circular-shaped actuators with channels routed underneath the actuators.

FIG. 4 is an illustration of a top view 400 of an example soft deformable high-density haptic bubble display that includes circular-shaped actuators with channels routed underneath the actuators. The example soft deformable high-density haptic bubble display may be a fifth haptic feedback system 402. The fifth haptic feedback system 402 may include multiple actuators. For example, actuator 404 may be an example of one of the actuators included in the fifth haptic feedback system 402. The actuator 404 is of a particular shape (e.g., a circle, an oval) and a particular size. In some implementations, referring to FIG. 1, a width 422 of the fifth haptic feedback system 402 at a wider end of the fifth haptic feedback system 402 (e.g., edge 420) may be approximately equal to the diameter 124 (e.g., approximately equal to 24 millimeters). In some implementations, the width 422 of the fifth haptic feedback system 402 at a wider end of the fifth haptic feedback system 402 (e.g., edge 420) may be less than the diameter 124.

Each of the actuators included in the fifth haptic feedback system 402 may be of the same shape and size as shown in FIG. 4. The fifth haptic feedback system 402 may include multiple channels (e.g., channel 406). Each channel may be routed to a respective actuator. For example, the channel 406 may be routed to actuator 404. The actuators included in the fifth haptic feedback system 402 may be included in a first layer of the fifth haptic feedback system 402. The channels included in the fifth haptic feedback system 402 may be included in a second layer of the fifth haptic feedback system 402. The second layer may be located below the first layer.

FIG. 5A is an illustration of a top view 500 of an example soft deformable high-density haptic bubble display for use in a haptic feedback system that shows tubular connections for connection to a pressure controller. The example soft deformable high-density haptic bubble display may be a sixth haptic feedback system 502. The sixth haptic feedback system 502 may include multiple actuators. For example, actuator 504 may be an example of one of the actuators included in the sixth haptic feedback system 502. The actuator 504 is of a particular shape (e.g., a hexagon) and a particular size.

Each of the actuators included in the sixth haptic feedback system 502 may be of the same shape and size as shown in FIG. 5A. The sixth haptic feedback system 502 may include multiple channels (e.g., channel 506). Each channel may be routed to a respective actuator. For example, the channel 506 may be routed to actuator 504. The actuators included in the sixth haptic feedback system 502 may be included in a first layer of the sixth haptic feedback system 502. The channels included in the sixth haptic feedback system 502 may be included in a second layer of the sixth haptic feedback system 502. The second layer may be located below the first layer. For example, the sixth haptic feedback system 502 may be any of the example haptic feedback systems described herein. As a reference for size comparison, FIG. 5A includes an illustration of a finger of a user (e.g., finger 514).

FIG. 5B is an illustration of an example pressure controller 550 for use in a haptic feedback system that includes a soft deformable high-density haptic bubble display. In some implementations, the sixth haptic feedback system 502 may be used in a haptic touchpad. The sixth haptic feedback system 502 may be included as part of a closed-loop pressure controlled haptic feedback system that enables analog pressure control of each individual actuator included in the sixth haptic feedback system 502. For example, each channel included in the sixth haptic feedback system 502 may be coupled to, connected to, or interfaced with a respective pressure control mechanism included in the pressure controller 550. Each pressure control mechanism may provide analog pressure control for each respective actuator. Such control may provide closed-loop pressure control of the sixth haptic feedback system 502. The use of closed-loop pressure control in the sixth haptic feedback system 502 may create localized sensation of object contact, edges, corners, gaps, and/or texture for an object at a human perceptual resolution for the haptic feedback. In addition, or in the alternative, a fast on/off actuation of an actuator may render localized vibrotactile haptic feedback on the body of a user. The rendering of the localized vibrotactile haptic feedback may better simulate contact on-set and contact off-set with a virtual object.

In some implementations, the actuators included in a haptic feedback system may be distributed at a variable density. In these implementations, a single-shot molding technique may be used for forming (e.g., manufacturing) such high-density bubble arrays. The distribution of the actuators at a variable density may better match a varying perceptual resolution of the human sensory system across a limb (e.g., finger or hand). The better matching may lead to a more optimal use of a control infrastructure (e.g., pressure regulators and/or valves) for the haptic feedback system. An optimized control structure may minimize the encumbrance of the haptic feedback system. For example, referring to FIGS. 1-5A, the actuators included in the haptic feedback systems as shown in FIGS. 1-5A may be distributed at a variable density.

In some implementations, haptic feedback systems may include different numbers of actuators. In some implementations, haptic feedback systems may include actuators that may be of different sizes and/or different shapes. In some implementations, haptic feedback systems may include actuators at different densities. In some implementations, the size, shape, number of actuators, and/or actuator density may be determined based on one or more factors. The factors may include, without limitation, the system that may incorporate the haptic feedback system, the available power provided by a power source, and the desired tactile feedback for providing to a user (e.g., recreating, for a user, a haptic sensation of object contact, edges, corners, gaps, and/or texture).

FIG. 6 is a block diagram of an example process 600 for creating a soft deformable high-density haptic bubble display. In some implementations, the process 600 for creating, generating, or forming the soft deformable high-density haptic bubble display may be a process or method for the manufacturing of a haptic feedback system. Referring to FIGS. 1-5A, the example process 600 may create, generate, and/or form the first haptic feedback system 102, the second haptic feedback system 104, the third haptic feedback system 202, the fourth haptic feedback system 302, the fifth haptic feedback system 402, and the sixth haptic feedback system 502.

In some implementations, the process 600 may be a lost wax molding process developed for single-shot molding of a soft deformable high-density haptic bubble display. The lost wax molding process may include molding a haptic feedback system, such as those described herein with reference to FIGS. 1-5A, in silicone in a single step using a 3D printed wax mold placed between two polycarbonate plates.

Step 602 in the process 600 may generate a computer-aided design (CAD) model of a wax mold for use in forming the haptic feedback system. The wax mold may include a cantilever structure. The wax mold may provide for one or more actuators in a first layer and one or more channels in a second layer. Each channel may be routed to a respective actuator.

At step 604, a three-dimensional (3D) wax mold with support wax is printed. The wax mold may include build wax for forming a haptic feedback system and support wax for supporting the wax mold. Forming, making, and/or manufacturing a soft deformable high-density set of actuators in a low encumbrance form-factor with deformable materials (e.g., a soft stretchable material with an optimum stiffness) that may achieve actuation at a low pneumatic pressure may ensure that the set of actuators may be easily integrated into fully untethered wearables that may operate on a battery. In some implementations, the 3D wax mold may be printed at a resolution (e.g., approximately 16 micrometers (μm)) that provides a low encumbrance (e.g., approximately 1.3 millimeter (mm) total thickness) and high-density of actuators (e.g., approximately 22 actuators per square centimeter (actuators/cm$^2$)) in a small form factor (e.g., a form factor the approximate size of a US quarter dollar as shown herein with reference to FIG. 1) for a haptic feedback system.

In addition, or in the alternative, in some implementations, the generating of a CAD model for a wax mold and the 3D printing of the wax mold allows for the creating, forming, and/or manufacturing of haptic feedback systems that may include actuators of different shapes and sizes as shown herein. In some implementations, each actuator included in a haptic feedback system may be the same shape and size. In some implementations, each actuator included in a haptic feedback system may be of a different shape and/or size. In addition, or in the alternative, in some implementations, the generating of a CAD model for a wax mold and the 3D printing of the wax mold allows for the creating, forming, and/or manufacturing of haptic feedback systems that may be actuated at a variety of inflation pressures (e.g., pressures of approximately two to twenty pounds per square inch (psi)).

At step 606, the wax mold is placed in a support wax removal bath. For example, the wax mold may be placed in an isopropyl alcohol (IPA) bath for removal of the support wax from the mold. For example, the bath may be at a particular temperature to facilitate the removal of the support wax (e.g., 33 degrees Celsius (C)).

At step 608, a silicone molding of the haptic feedback system may be performed by placing the wax mold between two plates while supplying a material that may be molded and cured in an ambient or room temperature environment to the wax mold. For example, the materials may include, but are not limited to, silicones and urethane acrylates. Use of such materials may allow for the optimization of a stiffness of each actuator included in the haptic feedback system and, as a result, may allow for the optimization of the overall stiffness of the haptic feedback system. For example, the wax mold may be placed between two polycarbonate plates while supplying silicone to the wax mold.

At step 610, the haptic feedback system may be cured at ambient or room temperature. For example, the silicone may be cured at ambient or room temperature. At step 612, the removal of the wax of the wax mold (e.g., the build wax) may be performed by placing the haptic feedback system in a mineral oil bath at a particular temperature (e.g., 90 degrees C.) along with repeated vacuuming.

The process 600 may provide a wax mold for a haptic feedback system that may generate, form, or create the actuators and channels for the haptic feedback system using a single mold. The process 600 may be a single-shot molding process for generating a soft deformable high-density set of actuators implemented as a bubble array in a haptic feedback system.

The use of a 3D printed wax mold of a CAD model with a cantilever structure that includes channels allows for the mold of the haptic feedback system to capture the desired complexity of the haptic feedback system in a single mold. The single mold may be used, as shown for example in the process 600, as a single-shot molding technique for the generating, creating, forming, and/or manufacturing of the haptic feedback system. The single-shot molding technique may eliminate a need for a multistep fabrication and bonding process to create, form, and/or manufacture the haptic feedback system that would involve the fabricating different individual actuator layers that would be subsequently bonded together.

The process of forming the haptic feedback system that includes 3D printing, silicone molding between two polycarbonate plates, curing, bathing, and vacuuming to remove the wax for building the haptic feedback system may be performed in an ambient temperature or room temperature environment. As such, the room, area, or environment in which the haptic feedback system is formed may not require specific temperature controls. For example, the forming of the haptic feedback system may occur in an environment with a temperature range around or between approximately 68 degrees Fahrenheit (F) to 80 degrees F.

In some implementations, the use of the 3D printed wax in the process 600 as a single-shot molding technique may allow for the use of a wide variety of different materials. For example, the generating, creating, forming, and/or manufacturing of the haptic feedback system may be material agnostic because the haptic feedback system may be manufactured in any material that may be molded and cured in an ambient or room temperature environment. For example, the materials may include, but are not limited to, silicones and urethane acrylates. Use of such materials may allow for the optimization of a stiffness of each actuator included in the haptic feedback system and, as a result, may allow for the optimization of the overall stiffness of the haptic feedback system.

In a non-limiting example, a soft, highly elastic silicone (e.g., a silicone of a Shore Hardness of 10 A (using a Shore A scale), an elongation at break (fracture strain) of 1000%, and a 100% modulus at a force of 22 psi at 100% elongation) for use in the fabrication of a haptic feedback system may require a reduced amount of energy for passive stretching of a membrane that forms the actuators included in the haptic feedback system allowing the majority of the energy to be used for active stretching of the membrane. For example, actuators included in such a haptic feedback system may provide a human perceptual resolution for haptic feedback starting at a relatively low operating pressure (e.g., approximately 2 to 3 psi). A quiet (relatively silent) small low power pneumatic pump (e.g., a piezoelectric pump) may drive the actuators included in the haptic feedback system by way of the respective channel to each actuator. In a non-limiting example, the piezoelectric pump may provide a pressure of 2.9 psi at a flow rate of nine liters/minute and a sound level of less than 40 decibels (dB). Such small form-factor low power relatively quiet pneumatic pumps that are battery-operated may easily be integrated with wearables when providing a fully untethered haptic feedback system.

Each channel may provide an inlet to the respective actuator for delivery of a fluid. A fluid may be a substance that changes shape in response to an applied force. Examples of such fluids may include, but are not limited to, liquids, gases, plasmas, and air. For example, a fluid that may be delivered to an actuator by way of a channel may be compressed air. Compressed air is a lightweight compressible fluid with low viscosity. A pneumatic source may be a fluid source that provides compressed air to an actuator by way of a channel when activating and/or operating the actuator. The use of a soft deformable high-density set of actuators implemented as a bubble array in a haptic feedback system may allow the haptic feedback system to achieve actuation of an actuator at a relatively low pneumatic pressure for the actuator. The use of a lower pneumatic pressure for actuation of the actuator may allow the haptic feedback system to include a smaller pneumatic source that draws less power. The smaller, lower power pneumatic source may contribute to a reduction in the size of the haptic feedback system ensuring that the set of actuators may be easily integrated into fully untethered wearables that operate on a battery.

FIG. 7A is an illustration of an example pneumatic pump 750. For example, the pneumatic pump may be a readily available off-the-shelf pneumatic pump. For example, the pressure of each actuator included in the haptic feedback system 702 may be on the order of approximately two to three pounds per square inch (psi). In some implementations, the haptic feedback system 702 may be one of the first haptic feedback system 102, the second haptic feedback system 104, the third haptic feedback system 202, the fourth haptic feedback system 302, the fifth haptic feedback system 402, or the sixth haptic feedback system 502.

FIG. 7B is an illustration of a fluidic system that includes a haptic feedback system 702, pneumatic tubing 710, pneumatic tubing 712, and a fluidic breakout 706. A pneumatic pump may provide low pressure actuation to actuators included in a haptic feedback system. For example, the pneumatic pump 750 may provide the low-pressure actuation of the haptic feedback system 702 by coupling to, connecting to, or interfacing with respective needles of a plurality of needles 704 included in a fluidic breakout 706. The fluidic breakout 706 may provide a connection between each needle of the plurality of needles 704 to a respective tube included in pneumatic tubing 710 or pneumatic tubing 712. Each tube included in the pneumatic tubing 710 and the pneumatic tubing 712 may be connected to, coupled to, or interfaced with a respective actuator included in the haptic feedback system 702. As such, the pneumatic pump 750 may provide low pressure actuation of the actuators included in the haptic feedback system 702 by way of the connection of the pneumatic pump 750 to the plurality of needles 704 of the fluidic system 700.

Figure 8A:
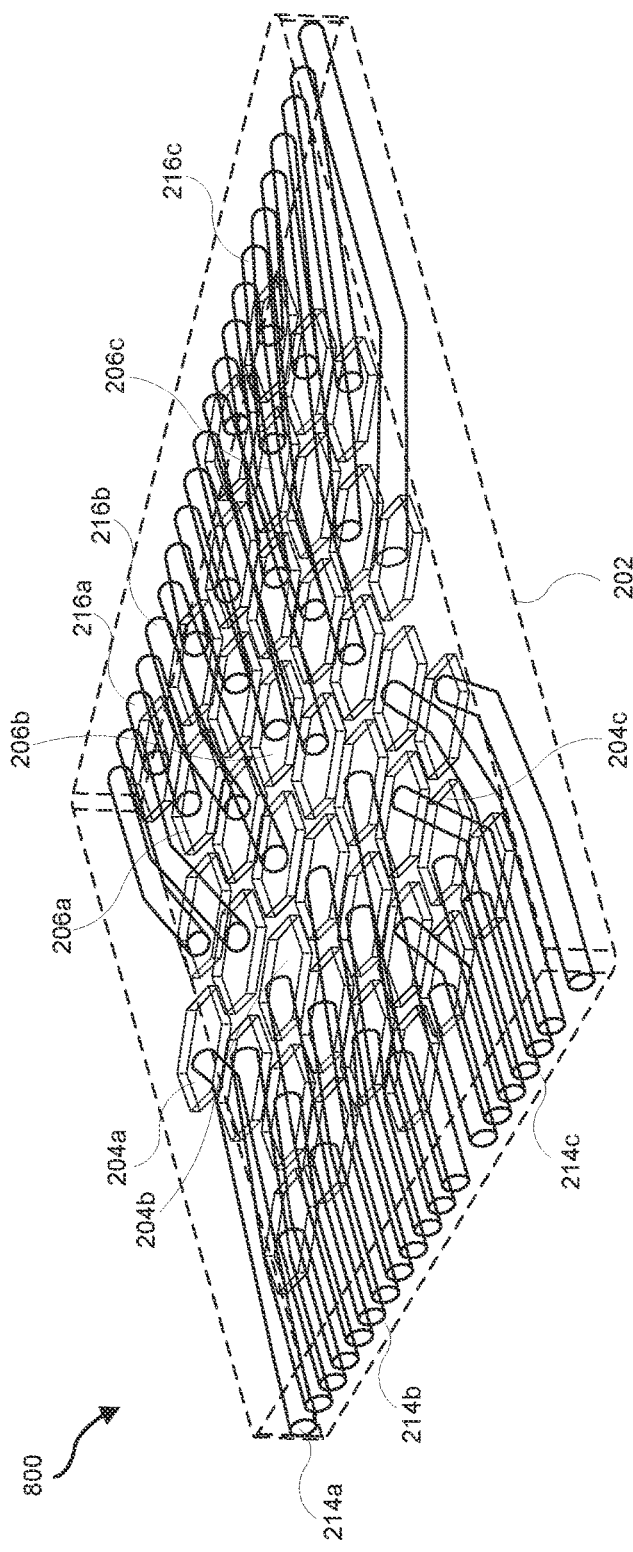
FIGS. 8A and 8B are illustrations of a side view and a cross-sectional view, respectively, of an example soft deformable high-density haptic bubble display.
Figure 8B:
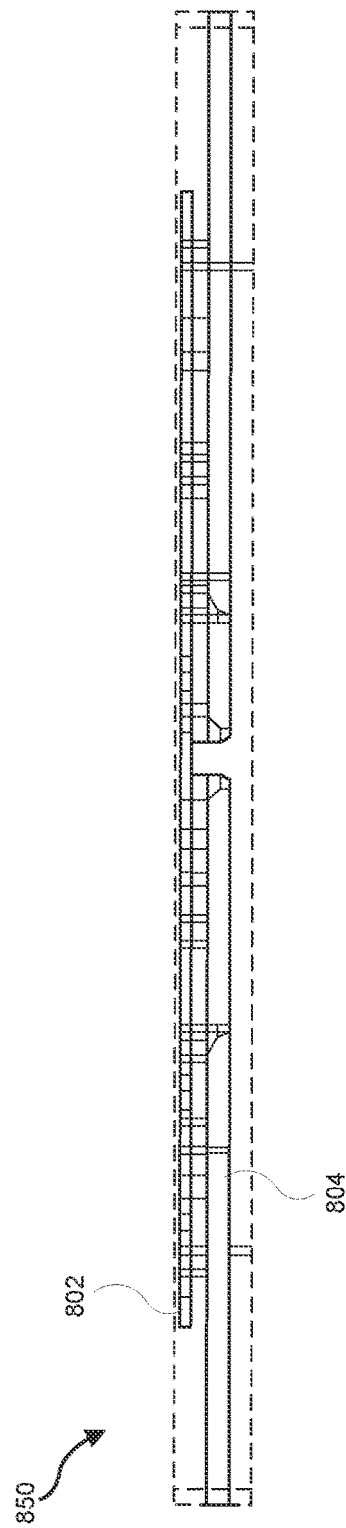

FIGS. 8A-B are illustrations of a side view 800 and a cross-sectional view 850, respectively, of the example soft deformable high-density haptic bubble display (e.g., the third haptic feedback system 202) a top view 200 of which is shown in FIG. 2. Referring to FIG. 8B, the channels 210 and the channels 212 are located in a second layer 804 that is below a first layer 802 that includes the multiple actuators (e.g., the actuators 204a-c and the actuators 206a-c). Though FIGS. 2 and 8A-B show the third haptic feedback system 202 in an orientation where channels are in a second layer placed below a first layer that includes the multiple actuators, in some implementations, a haptic feedback system may be orientated such that the first layer that includes multiple actuators may be located below a second layer that includes the channels. The orientation of a haptic feedback system may be determined based on, for example, the haptic device that may incorporate the haptic feedback system.

For example, referring to FIGS. 2 and 8A-B, channels 214a-c included in the channels 210 may be routed to, connected to, or interfaced with actuators 204a-c, respectively. Each channel 214a-c may provide an inlet to each respective actuator 204a-c for delivery of a substance that changes shape in response to an applied force, such as a fluid (e.g., compressed air). Channels 216a-c included in the channels 212 may be routed to, connected to, or interfaced with actuators 206a-c, respectively. Each channel 216a-c may provide an inlet to each respective actuator 206a-c for delivery of a substance that changes shape in response to an applied force, such as a fluid (e.g., compressed air).

The layout and size of each actuator included in a haptic feedback system may contribute to the fineness of the resolution for tactile feedback provided by the haptic feedback system. For example, an actuator density may define a number of actuators for a chosen unit area. In some implementations, the larger the number of actuators per unit area the increased fineness of the tactile feedback. In some implementations, a shape and/or size of each actuator may also contribute to the fineness of the resolution for the tactile feedback along with the actuator density. For example, the actuator density may be the same for two haptic feedback systems where the actuators in each system are of two different sizes.

In some implementations, in addition, or in the alternative, a surface actuation efficiency that defines a percentage of active area out of a total surface area of a haptic feedback system may contribute to the fineness of the resolution for tactile feedback provided by the haptic feedback system. For example, different actuator shapes may provide a different surface actuation efficiency for a haptic feedback system. In some implementations, a high density and high surface actuation efficiency haptic feedback system may provide, to a user, a haptic sensation of object contact, edges, corners, gaps, and/or texture by rendering sharp edges with continuity. For example, as shown in FIGS. 1-5A, and 8A-B, the routing of channels in a second layer of the haptic feedback system that is located below a first layer of actuators may result in a haptic feedback system with high actuator density along with a high surface actuation efficiency.

Providing haptic feedback to a user that is close to a human perceptual resolution for the haptic feedback may include providing haptic feedback that a human may perceive as two separate points. For example, a two-point discrimination test may indicate that a human may perceive two points as separate if the two points are spaced at least two to three mm apart on a fingertip of a hand of the user, 10-12 mm apart on a palm of a hand of a user, and 35-40 mm apart on a forearm of a user. In order to provide such haptic feedback to a user, a haptic feedback system may have an actuator density of approximately 11-25 actuators/cm$^2$ at a fingertip of a user, approximately 0.69 to one actuator/cm$^2$ at a palm of a hand of a user, and approximately 0.06 to 0.08 actuators/cm$^2$ at a forearm of a user. In some implementations, approximately 75% of the surface area in a haptic feedback system that is of an actuator density of approximately 22 actuators/cm$^2$ may be actively actuated, providing a high surface actuation efficiency (e.g., approximately 75%).

Figure 9:
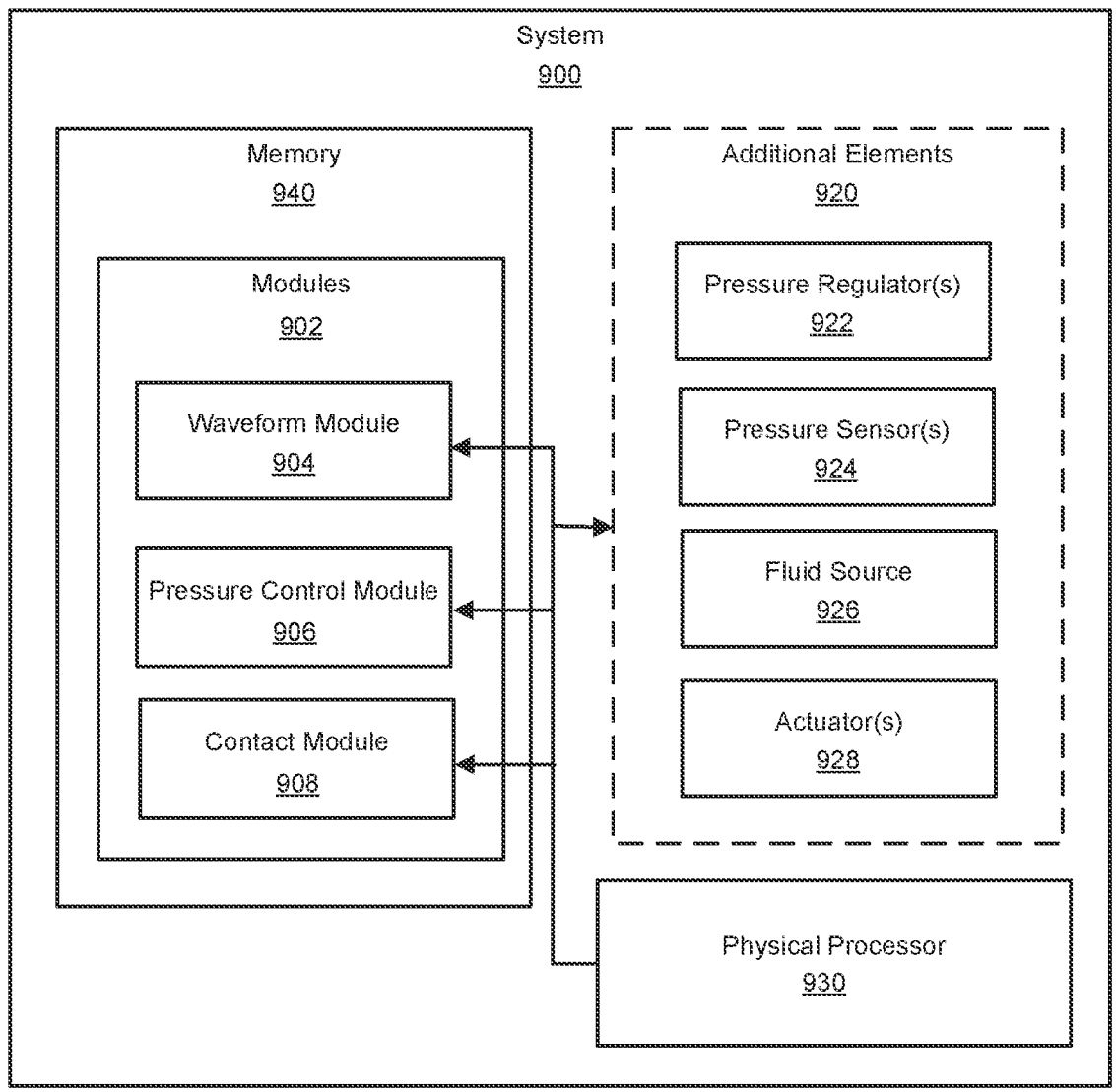
FIG. 9 is a block diagram of an example system that includes modules for use in a system for creating soft deformable high-density haptic bubble displays.

FIG. 9 is a block diagram of an example system 900 that includes modules for use in a system for controlling soft deformable high-density haptic bubble displays (e.g., haptic feedback systems) as described herein. In some implementations, the system 900 may be used to control one or more of the first haptic feedback system 102, the second haptic feedback system 104, the third haptic feedback system 202, the fourth haptic feedback system 302, the fifth haptic feedback system 402, the sixth haptic feedback system 502, and the haptic feedback system 702. Modules 902 may include a waveform module 904, a pressure control module 906, and a contact module 908. Although illustrated as separate elements, one or more of modules 902 in FIG. 9 may represent portions of a single module or application.

In some implementations, one or more of modules 902 may represent one or more software applications or programs that, when executed by a computing device, may cause the computing device to perform one or more tasks. As illustrated in FIG. 9, the example system 900 may also include one or more memory devices, such as memory 940. Memory 940 generally represents any type or form of volatile or non-volatile storage device or medium capable of storing data and/or computer-readable instructions. In one example, the memory 940 may store, load, and/or maintain one or more of modules 902. Examples of the memory 940 may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 9, example system 900 may also include one or more physical processors, such as physical processor 930. The physical processor 930 generally represents any type or form of hardware-implemented processing unit capable of interpreting and/or executing computer-readable instructions. In one example, the physical processor 930 may access and/or modify one or more of the modules 902 stored in the memory 940. Additionally, or alternatively, the physical processor 930 may execute one or more of the modules 902. Examples of the physical processor 930 may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 9, the example system 900 may also include one or more additional elements 920. The additional elements 920 may include fluidic mass regulator(s) 922, pressure sensor(s) 924, a fluid source 926, and actuator(s) 928. In some implementations, the pressure control module 906 may independently control the pressure of each of the actuator(s) 928 simultaneously. As described, the actuator(s) 928 may be included in any of all of the haptic feedback systems described herein. For example, the pressure control module 906 may interface with the fluid source 926, the fluidic mass regulator(s) 922, and the pressure sensor(s) 924 to control the individual pressure of each of the actuator(s) 928 simultaneously to provide, to a user, the fine tactile feedback needed to recreate a haptic sensation of object contact, edges, corners, gaps, and/or texture for the user. The fluid source 926 may provide a fluid (e.g., compressed air) to an actuator by way of a channel that is coupled or otherwise connected to the actuator when activating and/or operating the actuator.

In some implementations, a waveform module 904 may interact with the pressure control module 906 to provide complex waveforms (e.g., analog waveforms) for controlling the individual pressure of each of the actuator(s) 928 simultaneously. For example, the waveform module 904 may provide an in-phase sinusoidal linear chirp to the pressure control module 906 for controlling the fluidic mass regulator(s) 922, which control an amount of fluid provided by the fluid source 926 to each of the actuator(s) 928. In another example, the waveform module 904 may provide an out-of-phase sinusoidal linear chirp to the pressure control module 906 for controlling the fluidic mass regulator(s) 922, which control an amount of fluid provided by the fluid source 926 to each of the actuator(s) 928.

In some implementations, the system 900 may provide a closed-loop system for controlling the pressure of each actuator in a haptic feedback system by incorporating contact force sensing and location technology (e.g., touch technology) when providing analog pressure control of individual actuators when creating a localized sensation of object edges, corners, gaps, and/or texture. For example, referring to FIG. 5A, the finger 514 may be in contact with a touch sensing device (e.g., a touchpad). The contact module 908 may determine contact location and force provided by the finger 414 on the touchpad for use in providing a corresponding analog pressure control (e.g., by the pressure control module 906) to each individual actuator in the set of actuator(s) 928.

Figure 10:
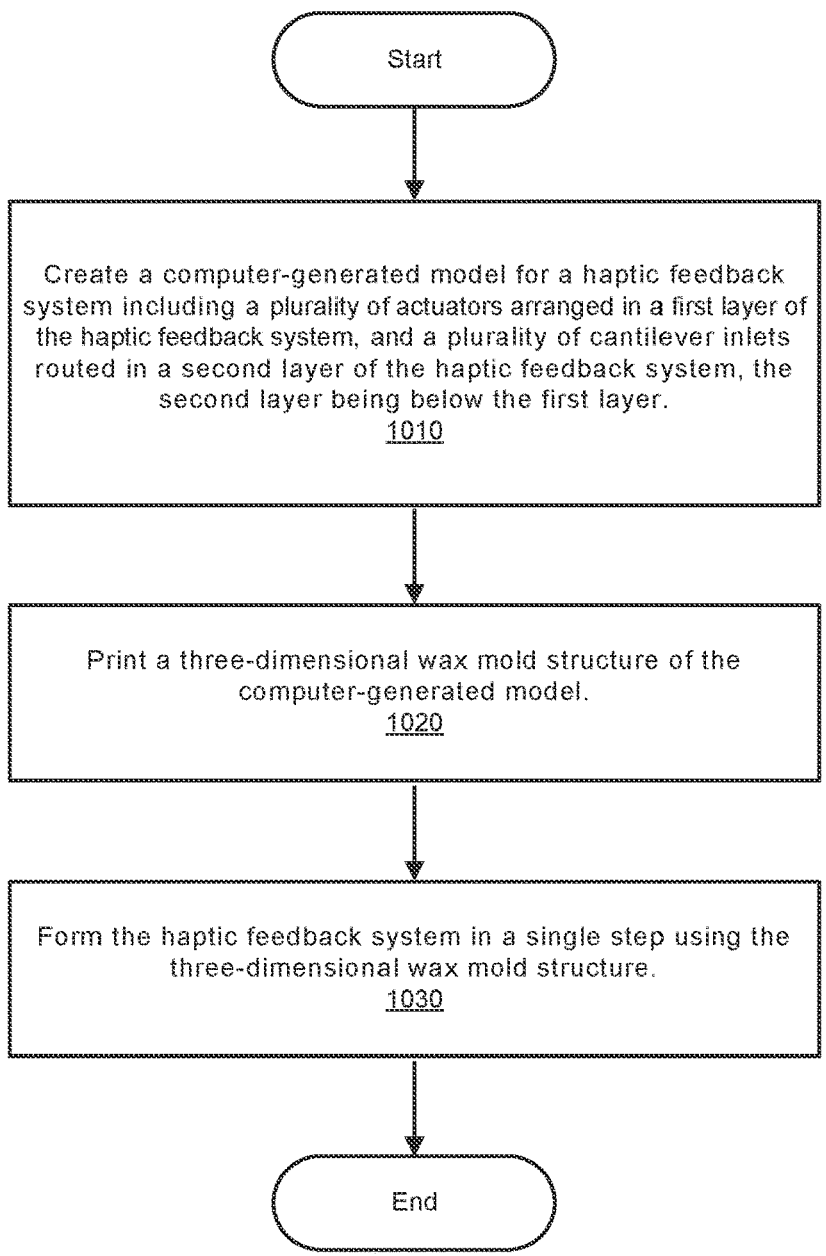
FIG. 10 is a flow diagram of an exemplary computer-implemented method for creating, forming, generating, or manufacturing a haptic feedback system.

FIG. 10 is a flow diagram of an exemplary computer-implemented method 1000 for creating, forming, generating, or manufacturing a haptic feedback system. The steps shown in FIG. 10 may be performed by, for example, the process 600 as illustrated in FIG. 6. In one example, each of the steps shown in FIG. 10 may represent an algorithm or sub-process whose structure includes and/or is represented by multiple sub-steps, examples of which will be provided in greater detail below.

As illustrated in FIG. 10, at step 1010 one or more of the systems described herein may create a computer-generated model for a haptic feedback system including a plurality of actuators arranged in a first layer of the haptic feedback system, and a plurality of channels routed in a second layer of the haptic feedback system, the second layer being below the first layer. For example, step 602 of the process 600 may generate a computer-aided design (CAD) model of a wax mold for use in forming a haptic feedback system.

In some embodiments, the term "haptic feedback system" may refer to a system of actuators that when activated provide haptic feedback to a user as rendered localized tactile pressure on a part of the body of the user (e.g., a hand, forearm, finger, a fingertip, a palm, etc.). Examples of a haptic feedback system may include, without limitation, a bubble array, a pneumatic bubble array, a bubble display, a pneumatic bubble display, a haptic bubble array, a haptic pneumatic bubble array, and a haptic bubble display.

In some embodiments, the term "actuator" may refer to a soft deformable bubble that when actuated (e.g., when a fluid is introduced into the bubble) may expand in relation to the amount of fluid provided to the bubble. Conversely, when a fluid is removed from the bubble (e.g., a force is applied to the bubble), the bubble may contract an amount if relation to the removal of the fluid. As described herein, a fluid may be a substance that changes shape in response to an applied force. Examples of such fluids may include, but are not limited to, liquids, gasses, plasmas, and air. For example, a fluid that may be delivered to an actuator by way of a channel may be compressed air.

As illustrated in FIG. 10, at step 1020 one or more of the systems described herein may print a three-dimensional wax mold structure of the computer-generated model. For example, step 604 of the process 600 may print a three-dimensional (3D) wax mold with support wax using the CAD model of the wax mold.

In some embodiments, the term "wax" may refer to a compound that is solid at ambient temperature and/or room temperatures. A wax may be insoluble in water but soluble in, for example, isopropyl alcohol. Examples of waxes may include, without limitation, plant waxes, animal waxes, mineral waxes, petroleum waxes, and polyethylene waxes.

As illustrated in FIG. 10, at step 1030 one or more of the systems described herein may form the haptic feedback system in a single step using the three-dimensional wax mold structure. For example, the process 600 may provide a wax mold for a haptic feedback system that may generate, form, or create the actuators and channels for the haptic feedback system using a single mold. The process 600 may be a single-shot molding process for generating a soft deformable high-density set of actuators implemented as a bubble array in a haptic feedback system.

Figure 11:
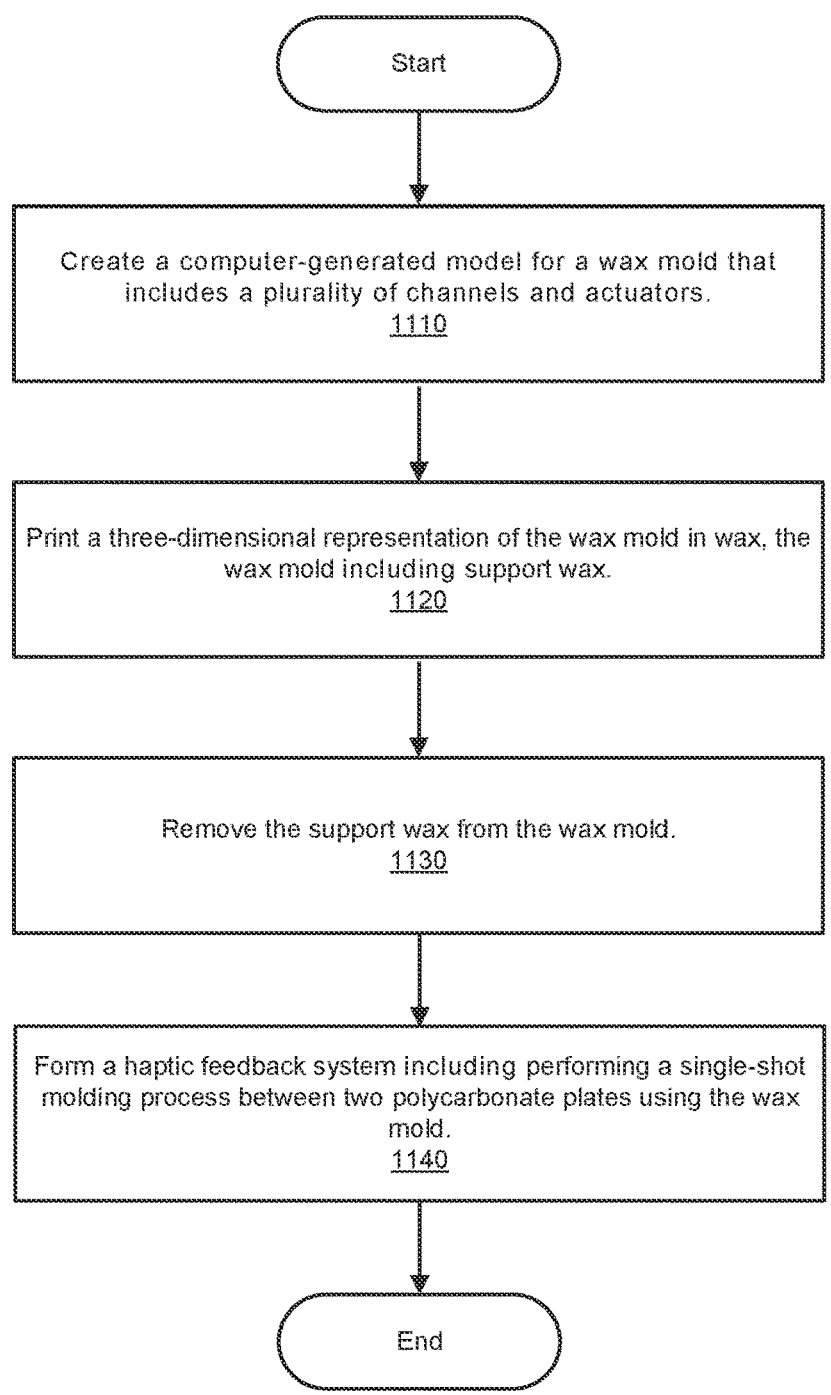
FIG. 11 is a flow diagram of an exemplary computer-implemented method for forming a haptic feedback system by performing a single-shot molding process between two polycarbonate plates using a wax mold.

FIG. 11 is a flow diagram of an exemplary computer-implemented method 1100 for forming a haptic feedback system by performing a single-shot molding process between two polycarbonate plates using a wax mold. The steps shown in FIG. 11 may be performed by, for example, the process 600 as illustrated in FIG. 6. In one example, each of the steps shown in FIG. 11 may represent an algorithm or sub-process whose structure includes and/or is represented by multiple sub-steps, examples of which will be provided in greater detail below.

As illustrated in FIG. 11, at step 1110 one or more of the systems described herein may create a computer-generated model for a wax mold that includes a plurality of channels and actuators. For example, step 602 of the process 600 may generate a computer-aided design (CAD) model of a wax mold for use in forming a haptic feedback system. As shown in FIGS. 1-5A, 6, and 8A-B, the CAD model for the mold may include a plurality of actuators on a first layer and a plurality of channels on a second layer. In some implementations, the second layer may be below the first layer. Each channel may connect to, couple to, or interface with a respective actuator.

As illustrated in FIG. 11, at step 1120 one or more of the systems described herein may print a three-dimensional representation of the wax mold in wax, the wax mold including support wax. For example, the process 600 at step 604 may print a three-dimensional (3D) wax mold that includes build wax and support wax using the CAD model of the mold. For example, the support wax may be excess wax around or outside of the build wax of the wax mold that is formed when the wax mold is 3D printed.

As illustrated in FIG. 11, at step 1130 one or more of the systems described herein may remove the support wax from the wax mold. For example, the process 600 at step 606 may place the wax mold in an isopropyl alcohol bath for removal of the support wax from the wax mold.

As illustrated in FIG. 11, at step 1140 one or more of the systems described herein may form a haptic feedback system including performing a single-shot molding process between two polycarbonate plates using the wax mold. For example, the process at step 608 may place the wax mold between two polycarbonate plates when performing a silicone molding process. The silicone molding process may generate a haptic feedback system such as those described with reference to FIGS. 1-5A that includes a plurality of actuators on a first layer and a plurality of channels on a second layer where each channel may connect to, couple to, or interface with a respective actuator. The silicone molding process using the wax mold may generate such a haptic feedback system in a single step using a single wax mold (e.g., a single-shot molding process).

Creating, forming, generating, or manufacturing of soft deformable high-density haptic bubble displays using the single-shot molding technique as described herein may provide high-density bubble arrays of a thickness and density that allows for the creation of extremely robust actuators in a variety of shapes and sizes. These high-density bubble arrays may provide haptic feedback systems that adequately provide human perceptual resolution for haptic feedback including the fine tactile feedback needed to recreate, for the user, a haptic sensation of object contact, edges, corners, gaps, and/or texture. These high-density bubble arrays allow for a haptic feedback system that may easily be integrated into an untethered wearable because the overall size of the haptic feedback system may be kept small based on the ability to actuate the actuators at a low pneumatic pressure. In addition, or in the alternative, the low pneumatic pressure may allow the haptic feedback system to operate on a battery.

Example 1: A method may include creating a computer-generated model for a haptic feedback system including a plurality of actuators arranged in a first layer of the haptic feedback system, and a plurality of channels routed in a second layer of the haptic feedback system, the second layer being below the first layer, printing a three-dimensional wax mold structure of the computer-generated model, and forming the haptic feedback system in a single step using the three-dimensional wax mold structure.

Example 2: The method of Example 1, where forming the haptic feedback system in a single step using the three-dimensional wax mold structure may include molding the haptic feedback system and curing the haptic feedback system.

Example 3: The method of Example 2, where the haptic feedback system may include a material capable of being molded and cured at an ambient temperature.

Example 4: The method of Example 3, where the material may be one of a silicone or urethane acrylate.

Example 5: The method of any of Examples 1-4, where the plurality of actuators may be arranged in the first layer such that a density of the plurality of actuators is at a human perceptual resolution.

Example 6: The method of Example 5, where the density of the plurality of actuators may be approximately twenty-two actuators per square centimeter.

Example 7: The method of any of Examples 1-6, where the three-dimensional wax mold structure of the computer-generated model may be printed at a resolution of approximately sixteen micrometers.

Example 8: The method of any of Examples 1-7, where a thickness of the haptic feedback system may be approximately 1.3 millimeters.

Example 9: The method of any of Examples 1-8, where a shape of each of the plurality of actuators may determine a surface actuation efficiency for the haptic feedback system.

Example 10: The method of any of Examples 1-9, where the haptic feedback system may be actuated by providing air at one of many possible inflation pressures into the channels.

Example 11: A haptic feedback system may include a plurality of actuators arranged in a first layer of the haptic feedback system, and a plurality of channels routed in a second layer of the haptic feedback system, the second layer being below the first layer, and the haptic feedback system being formed in a single step using a printed three-dimensional wax mold structure.

Example 12: The system of Example 11, where the haptic feedback system may be included in a wearable device that provides haptic feedback to a user of the wearable device.

Example 13: The system of any of Examples 11 and 12, where the wearable device may be incorporated into an environment that comprises one of a virtual reality (VR) system, an augmented reality (AR) system, or a mixed reality (MR) system, the environment may provide content to the user of the wearable device, and the haptic feedback may be associated with the content.

Example 14: A method may include creating a computer-generated model for a wax mold that includes a plurality of channels and actuators, printing a three-dimensional representation of the wax mold in wax, the wax mold including support wax, removing the support wax from the wax mold, and forming a haptic feedback system including performing a single-shot molding process between two polycarbonate plates using the wax mold.

Example 15: The method of Example 1, where removing the support wax from the wax mold may further include placing the wax mold in an isopropyl alcohol bath.

Example 16: The method of any of Examples 14 and 15, where performing the single-shot molding process may include supplying silicone to the wax mold, and forming the haptic feedback system may further include, subsequent to performing the single-shot molding process, curing the silicone.

Example 17: The method of Example 16, where the printing of the three-dimensional representation of the wax mold in wax, the removing of the support wax from the wax mold, the single-shot molding process, and the curing of the silicone may be performed in an ambient temperature environment.

Example 18: The method of any of Examples 16 and 17, where the wax mold may further include build wax, and forming the haptic feedback system may further include, subsequent to curing the silicone, removing the build wax.

Example 19: The method of Example 18, where removing the build wax may include placing the haptic feedback system in a mineral oil bath.

Example 20: The method of any of Examples 18 and 19, where removing the build wax may further include repeated vacuuming of the haptic feedback system.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
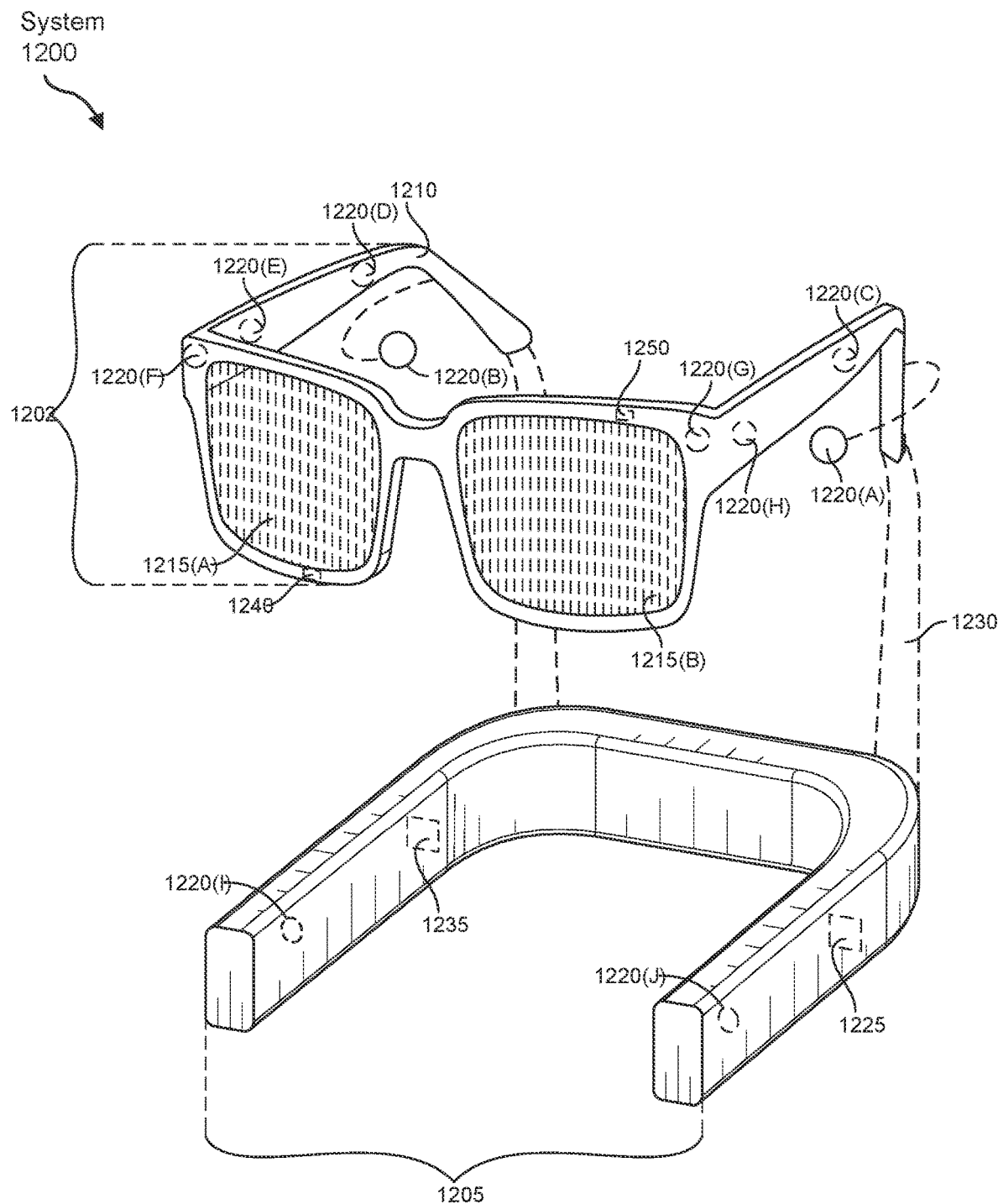
FIG. 12 is an illustration of exemplary augmented-reality glasses that may be used in connection with embodiments of this disclosure.

Turning to FIG. 12, augmented-reality system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220(A)-1220(J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 13 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on frame 1210, and/or acoustic transducers 1220(1) and 1220(J), which may be positioned on a corresponding neckband 1205.

In some embodiments, one or more of acoustic transducers 1220(A)-(F) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented-reality system 1200 may simulate binaural hearing and capture a 3D stereo sound field around about a user's head. In some embodiments, acoustic transducers 1220(A) and 1220(B) may be connected to augmented-reality system 1200 via a wired connection 1230, and in other embodiments acoustic transducers 1220(A) and 1220(B) may be connected to augmented-reality system 1200 via a wireless connection (e.g., a Bluetooth connection). In still other embodiments, acoustic transducers 1220(A) and 1220(B) may not be used at all in conjunction with augmented-reality system 1200.

Acoustic transducers 1220 on frame 1210 may be positioned in a variety of different ways, including along the length of the temples, across the bridge, above or below display devices 1215(A) and 1215(B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(1) and 1220(J)) that are part of the microphone array (or potentially form their own microphone subarray). Neckband 1205 may also include a controller 1225 and a power source 1235.

Acoustic transducers 1220(1) and 1220(J) of neckband 1205 may be configured to detect sound and convert the detected sound into an electronic format (analog or digital). In the embodiment of FIG. 12, acoustic transducers 1220(1) and 1220(J) may be positioned on neckband 1205, thereby increasing the distance between the neckband acoustic transducers 1220(1) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable for the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the systems 1200 and 1300 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, Bluetooth, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Figure 15:
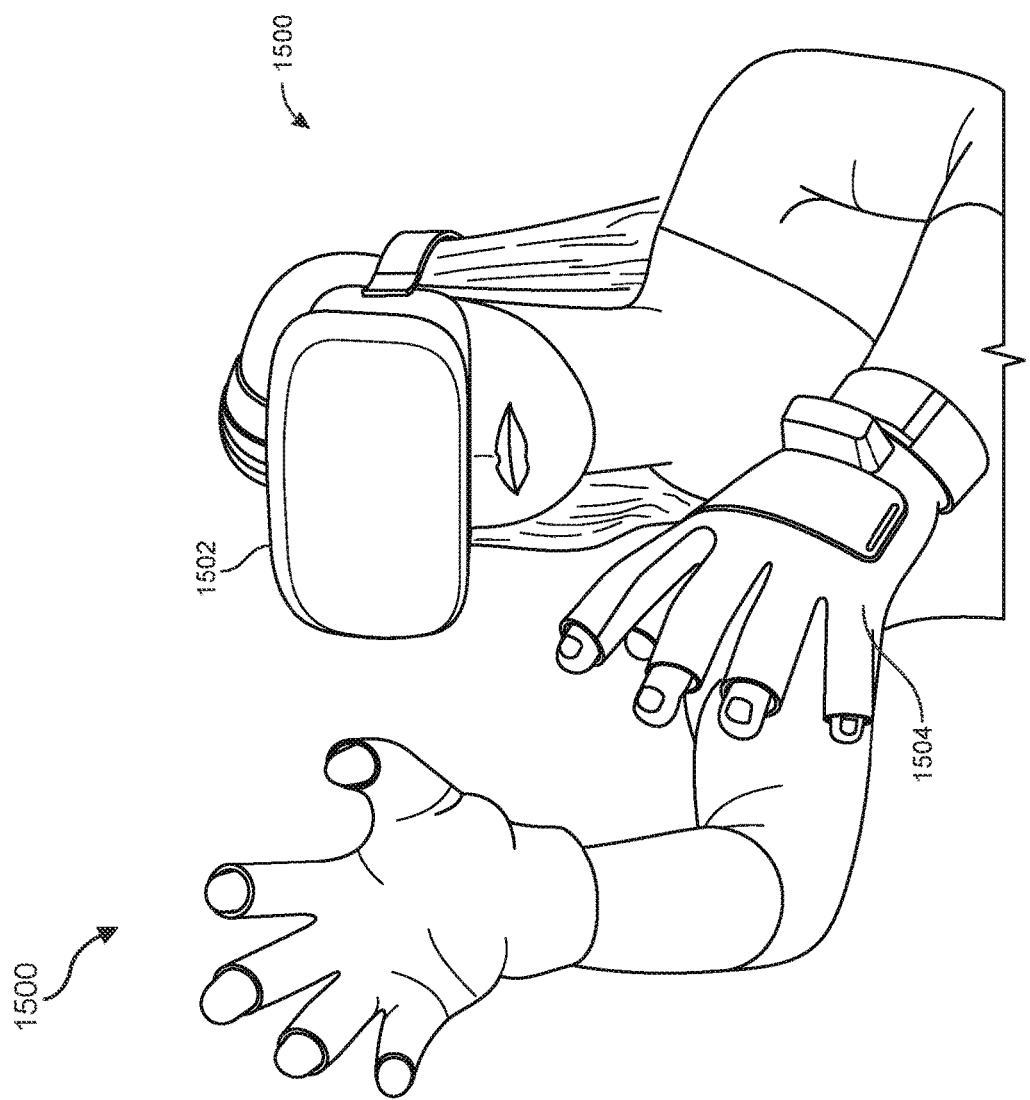
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial-reality environment 1500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 13:
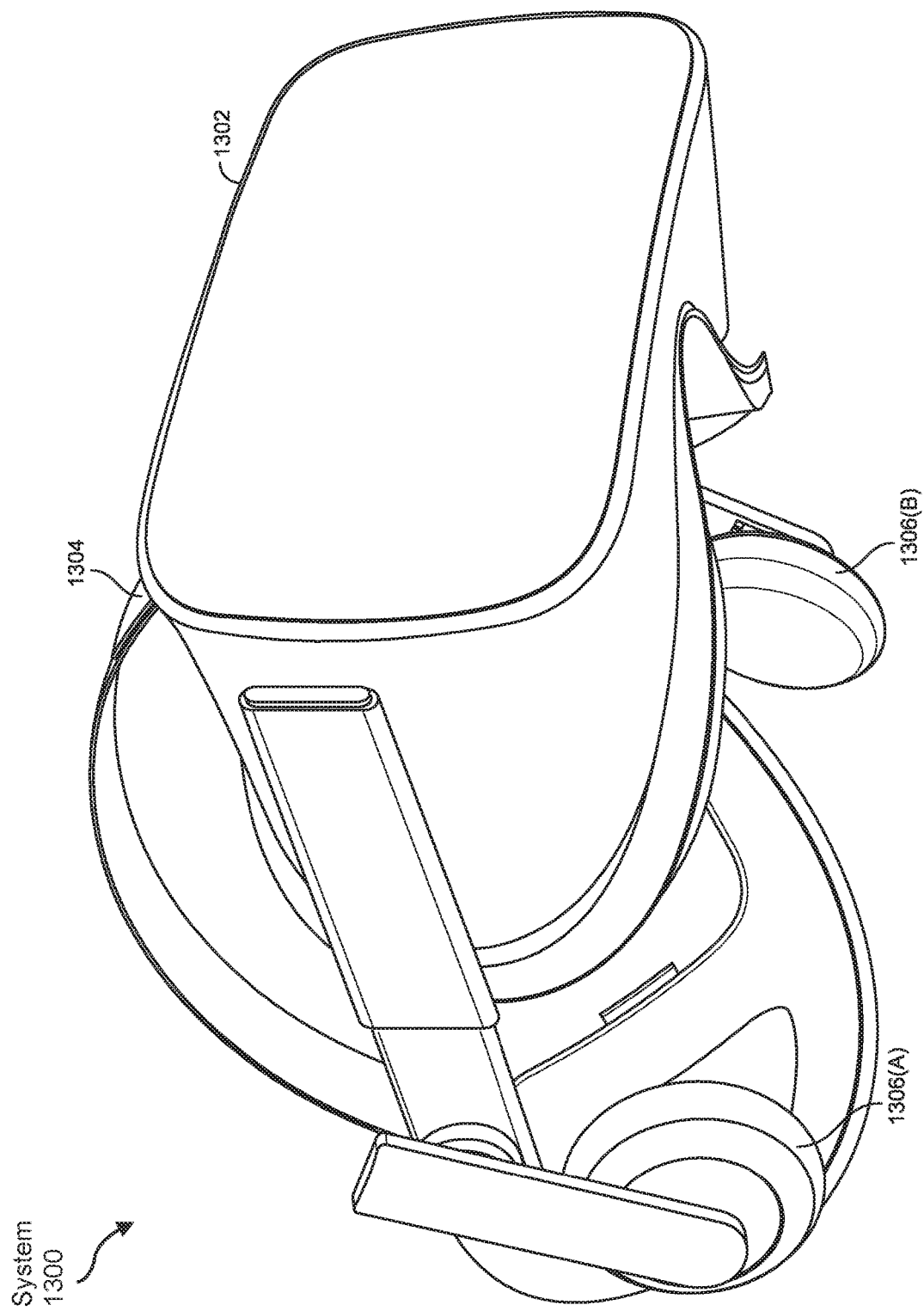
FIG. 13 is an illustration of an exemplary virtual-reality headset that may be used in connection with embodiments of this disclosure.

Head-mounted display 1502 generally represents any type or form of virtual-reality system, such as virtual-reality system 1300 in FIG. 13. Haptic device 1504 generally represents any type or form of wearable device, worn by a user of an artificial-reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

While haptic interfaces may be used with virtual-reality systems, as shown in FIG. 15, haptic interfaces may also be used with augmented-reality systems, as shown in FIG. 16. FIG. 16 is a perspective view of a user 1610 interacting with an augmented-reality system 1600. In this example, user 1610 may wear a pair of augmented-reality glasses 1620 that may have one or more displays 1622 and that are paired with a haptic device 1630. In this example, haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

Figure 17:
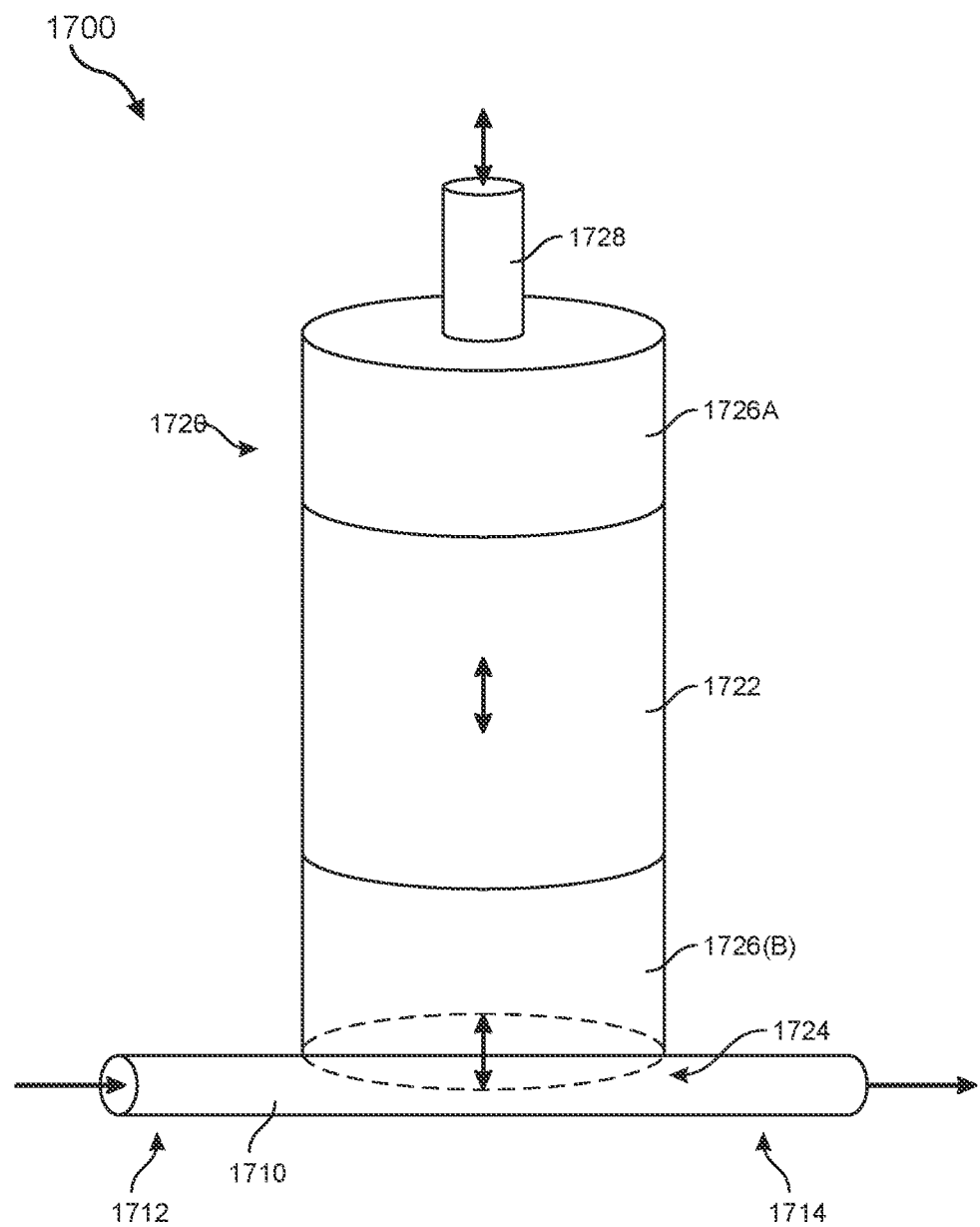
FIG. 17 is an illustration of an exemplary fluidic control system that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 17 shows a schematic diagram of a fluidic valve 1700 for controlling flow through a fluid channel 1710, according to at least one embodiment of the present disclosure. Fluid from a fluid source (e.g., a pressurized fluid source, a fluid pump, etc.) may flow through the fluid channel 1710 from an inlet port 1712 to an outlet port 1714, which may be operably coupled to, for example, a fluid-driven mechanism, another fluid channel, or a fluid reservoir.

Fluidic valve 1700 may include a gate 1720 for controlling the fluid flow through fluid channel 1710. Gate 1720 may include a gate transmission element 1722, which may be a movable component that is configured to transmit an input force, pressure, or displacement to a restricting region 1724 to restrict or stop flow through the fluid channel 1710. Conversely, in some examples, application of a force, pressure, or displacement to gate transmission element 1722 may result in opening restricting region 1724 to allow or increase flow through the fluid channel 1710. The force, pressure, or displacement applied to gate transmission element 1722 may be referred to as a gate force, gate pressure, or gate displacement. Gate transmission element 1722 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 17, gate 1720 of fluidic valve 1700 may include one or more gate terminals, such as an input gate terminal 1726(A) and an output gate terminal 1726(B) (collectively referred to herein as "gate terminals 1726") on opposing sides of gate transmission element 1722. Gate terminals 1726 may be elements for applying a force (e.g., pressure) to gate transmission element 1722. By way of example, gate terminals 1726 may each be or include a fluid chamber adjacent to gate transmission element 1722. Alternatively or additionally, one or more of gate terminals 1726 may include a solid component, such as a lever, screw, or piston, that is configured to apply a force to gate transmission element 1722.

In some examples, a gate port 1728 may be in fluid communication with input gate terminal 1726(A) for applying a positive or negative fluid pressure within the input gate terminal 1726(A). A control fluid source (e.g., a pressurized fluid source, a fluid pump, etc.) may be in fluid communication with gate port 1728 to selectively pressurize and/or depressurize input gate terminal 1726(A). In additional embodiments, a force or pressure may be applied at the input gate terminal 1726(A) in other ways, such as with a piezoelectric element or an electromechanical actuator, etc.

In the embodiment illustrated in FIG. 17, pressurization of the input gate terminal 1726(A) may cause the gate transmission element 1722 to be displaced toward restricting region 1724, resulting in a corresponding pressurization of output gate terminal 1726(B). Pressurization of output gate terminal 1726(B) may, in turn, cause restricting region 1724 to partially or fully restrict to reduce or stop fluid flow through the fluid channel 1710. Depressurization of input gate terminal 1726(A) may cause gate transmission element 1722 to be displaced away from restricting region 1724, resulting in a corresponding depressurization of the output gate terminal 1726(B). Depressurization of output gate terminal 1726(B) may, in turn, cause restricting region 1724 to partially or fully expand to allow or increase fluid flow through fluid channel 1710. Thus, gate 1720 of fluidic valve 1700 may be used to control fluid flow from inlet port 1712 to outlet port 1714 of fluid channel 1710. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A method comprising:
   creating a computer-generated model for a haptic feedback system comprising:
   a plurality of actuators arranged in a first layer of the haptic feedback system; and
   a plurality of channels routed in a second layer of the haptic feedback system, the second layer being below the first layer;
   printing a three-dimensional wax mold structure of the computer-generated model; and
   forming the haptic feedback system in a single step using the three-dimensional wax mold structure.

2. The method of claim 1, wherein forming the haptic feedback system in a single step using the three-dimensional wax mold structure comprises:
   molding the haptic feedback system; and
   curing the haptic feedback system.

3. The method of claim 2, wherein the haptic feedback system comprises a material capable of being molded and cured at an ambient temperature.

4. The method of claim 3, wherein the material is one of a silicone or urethane acrylate.

5. The method of claim 1, wherein the plurality of actuators are arranged in the first layer such that a density of the plurality of actuators is at a human perceptual resolution.

6. The method of claim 5, wherein the density of the plurality of actuators is approximately twenty-two actuators per square centimeter.

7. The method of claim 1, wherein the three-dimensional wax mold structure of the computer-generated model is printed at a resolution of approximately sixteen micrometers.

8. The method of claim 1, wherein a thickness of the haptic feedback system is approximately 1.3 millimeters.

9. The method of claim 1, wherein a shape of each of the plurality of actuators determines a surface actuation efficiency for the haptic feedback system.

10. The method of claim 1, wherein the haptic feedback system is actuated by providing air at one of many possible inflation pressures into the channels.

11. A method comprising:
creating a computer-generated model for a wax mold comprising a plurality of channels and actuators;
printing a three-dimensional representation of the wax mold in wax, the wax mold comprising support wax;
removing the support wax from the wax mold; and
forming a haptic feedback system comprising performing a single-shot molding process between two polycarbonate plates using the wax mold.

12. The method of claim 11, wherein removing the support wax from the wax mold further comprises placing the wax mold in an isopropyl alcohol bath.

13. The method of claim 11, wherein:
performing the single-shot molding process comprises supplying silicone to the wax mold; and
forming the haptic feedback system further comprises, subsequent to performing the single-shot molding process, curing the silicone.

14. The method of claim 13, wherein the printing of the three-dimensional representation of the wax mold in wax, the removing of the support wax from the wax mold, the single-shot molding process, and the curing of the silicone are performed in an ambient temperature environment.

15. The method of claim 13, wherein:
the wax mold further comprises build wax; and
forming the haptic feedback system further comprises, subsequent to curing the silicone, removing the build wax.

16. The method of claim 15, wherein removing the build wax comprises placing the haptic feedback system in a mineral oil bath.

17. The method of claim 16, wherein removing the build wax further comprises repeated vacuuming of the haptic feedback system.

* * * * *